United States Patent
Canberk

(10) Patent No.: US 11,546,505 B2
(45) Date of Patent: Jan. 3, 2023

(54) TOUCHLESS PHOTO CAPTURE IN RESPONSE TO DETECTED HAND GESTURES

(71) Applicant: Ilteris Canberk, Marina Del Rey, CA (US)

(72) Inventor: Ilteris Canberk, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/034,865

(22) Filed: Sep. 28, 2020

(65) Prior Publication Data

US 2022/0103748 A1    Mar. 31, 2022

(51) Int. Cl.
*H04N 5/232* (2006.01)
*G06V 40/10* (2022.01)

(52) U.S. Cl.
CPC ....... *H04N 5/23219* (2013.01); *G06V 40/113* (2022.01); *H04N 5/23293* (2013.01)

(58) Field of Classification Search
CPC ............ G06K 9/00382; G06K 9/00389; G06F 3/04815; G06F 3/017; G06F 3/02;
(Continued)

(56) References Cited

U.S. PATENT DOCUMENTS 9,024,842 B1    5/2015  Gomez et al.
9,098,739 B2    8/2015  Mutto et al.
(Continued)

FOREIGN PATENT DOCUMENTS

CN    106199511 A    12/2016
EP    3116615 A1     1/2017
(Continued)

OTHER PUBLICATIONS

Partial International Search Report and Written Opinion for International Application No. PCT/US2021/047637, dated Jan. 7, 2022 (dated Jul. 1, 2022)—10 pages.

(Continued)

*Primary Examiner* — Rowina J Cattungal
(74) *Attorney, Agent, or Firm* — Culhane Meadows PLLC; Stephen J. Weed

(57) ABSTRACT

Example systems, devices, media, and methods are described for capturing still images in response to hand gestures detected by an eyewear device that is capturing frames of video data with its camera system. A localization system determines the eyewear location relative to the physical environment. An image processing system detects a hand shape in the video data and determines whether the detected hand shape matches a border gesture or a shutter gesture. In response to a border gesture, the system establishes a border that defines the still image to be captured. In response to a shutter gesture, the system captures a still image from the frames of video data. The system determines a shutter gesture location relative to the physical environment. The captured still image is presented on the display at or near the shutter gesture location, such that the still image appears anchored relative to the physical environment. The captured still image is viewable by other devices that are using the image capture system.

20 Claims, 17 Drawing Sheets

(58) Field of Classification Search
CPC . G06F 3/0481; G06F 3/0484; H04N 5/23219; G02B 27/01; G06V 40/113

See application file for complete search history.

(56) References Cited

U.S. PATENT DOCUMENTS

| | | | |
|---|---|---|---|
| 9,235,051 | B2 | 1/2016 | Salter et al. |
| 9,459,454 | B1 | 10/2016 | The et al. |
| 9,541,996 | B1 | 1/2017 | Baxter et al. |
| 9,552,673 | B2 | 1/2017 | Hilliges et al. |
| 9,990,029 | B2 | 6/2018 | Kochi |
| 9,996,983 | B2 | 6/2018 | Mullins |
| 10,057,400 | B1 | 8/2018 | Gordon et al. |
| 10,146,414 | B2 | 12/2018 | Heater |
| 10,220,303 | B1 | 3/2019 | Schmidt et al. |
| 10,372,228 | B2 | 8/2019 | Mao et al. |
| 10,394,334 | B2 | 8/2019 | Wang |
| 10,509,461 | B2 | 12/2019 | Mullen |
| 10,579,207 | B2 | 3/2020 | Piya et al. |
| 10,782,779 | B1 | 9/2020 | Eubank et al. |
| 10,853,991 | B1 | 12/2020 | Yan et al. |
| 11,086,126 | B1* | 8/2021 | Gollier .......... G06F 1/1654 |
| 2010/0085317 | A1 | 4/2010 | Park et al. |
| 2011/0213664 | A1 | 9/2011 | Osterhout et al. |
| 2012/0113223 | A1 | 5/2012 | Hilliges et al. |
| 2012/0327117 | A1 | 12/2012 | Weller et al. |
| 2013/0328927 | A1 | 12/2013 | Mount et al. |
| 2014/0043211 | A1 | 2/2014 | Park |
| 2014/0225918 | A1 | 8/2014 | Mittal et al. |
| 2014/0347289 | A1 | 11/2014 | Suh et al. |
| 2014/0361988 | A1* | 12/2014 | Katz .......... G02B 27/0172 345/156 |
| 2014/0368533 | A1 | 12/2014 | Salter et al. |
| 2015/0049017 | A1* | 2/2015 | Weber .......... G06F 21/36 345/156 |
| 2015/0097719 | A1 | 4/2015 | Balachandreswaran et al. |
| 2015/0109197 | A1 | 4/2015 | Takagi |
| 2015/0317833 | A1 | 11/2015 | Ebstyne et al. |
| 2015/0331576 | A1 | 11/2015 | Piya et al. |
| 2015/0370321 | A1 | 12/2015 | Lundberg |
| 2016/0033770 | A1 | 2/2016 | Fujimaki et al. |
| 2016/0035134 | A1 | 2/2016 | Tanaka et al. |
| 2016/0260251 | A1 | 9/2016 | Stafford et al. |
| 2016/0261834 | A1 | 9/2016 | Li et al. |
| 2016/0306431 | A1* | 10/2016 | Stafford .......... G06F 3/005 |
| 2017/0014683 | A1 | 1/2017 | Maruyama et al. |
| 2017/0028299 | A1 | 2/2017 | The et al. |
| 2017/0053447 | A1 | 2/2017 | Chen et al. |
| 2017/0124713 | A1 | 5/2017 | Jurgenson et al. |
| 2017/0140552 | A1* | 5/2017 | Woo .......... G06F 3/011 |
| 2017/0270711 | A1 | 9/2017 | Schoenberg |
| 2017/0293364 | A1 | 10/2017 | Wang |
| 2017/0295446 | A1 | 10/2017 | Shivappa |
| 2017/0352184 | A1 | 12/2017 | Poulos et al. |
| 2017/0357334 | A1 | 12/2017 | Balan et al. |
| 2018/0005443 | A1 | 1/2018 | Poulos et al. |
| 2018/0024641 | A1 | 1/2018 | Mao et al. |
| 2018/0039852 | A1 | 2/2018 | Nakamura et al. |
| 2018/0075659 | A1 | 3/2018 | Browy et al. |
| 2018/0196503 | A1 | 7/2018 | Ikeda et al. |
| 2018/0259775 | A1 | 9/2018 | Ono et al. |
| 2018/0329209 | A1 | 11/2018 | Nattukallingal |
| 2019/0025595 | A1 | 1/2019 | Fukuda et al. |
| 2019/0102927 | A1 | 4/2019 | Yokokawa |
| 2019/0122085 | A1 | 4/2019 | Tout et al. |
| 2019/0220098 | A1 | 7/2019 | Gupta |
| 2019/0299059 | A1 | 10/2019 | Case, Jr. et al. |
| 2019/0318544 | A1 | 10/2019 | Skidmore et al. |
| 2019/0324553 | A1 | 10/2019 | Liu et al. |
| 2019/0325651 | A1 | 10/2019 | Bradner et al. |
| 2019/0361521 | A1 | 11/2019 | Stellmach et al. |
| 2019/0377416 | A1* | 12/2019 | Alexander .......... G06F 3/04842 |
| 2020/0005026 | A1 | 1/2020 | Andersen et al. |
| 2020/0064924 | A1 | 2/2020 | Poupyrev et al. |
| 2020/0097065 | A1 | 3/2020 | Iyer et al. |
| 2020/0218423 | A1 | 7/2020 | Ohashi |
| 2020/0311396 | A1 | 10/2020 | Pollefeys et al. |
| 2020/0312029 | A1 | 10/2020 | Heinen et al. |
| 2021/0019036 | A1 | 1/2021 | Wang et al. |
| 2021/0041702 | A1* | 2/2021 | Kimura .......... G02B 27/0172 |
| 2021/0090337 | A1 | 3/2021 | Ravasz et al. |
| 2021/0096726 | A1* | 4/2021 | Faulkner .......... G06F 1/1626 |
| 2021/0208698 | A1 | 7/2021 | Martin et al. |
| 2021/0209153 | A1 | 7/2021 | Zhang |
| 2021/0275914 | A1 | 9/2021 | Wu et al. |

FOREIGN PATENT DOCUMENTS

| | | |
|---|---|---|
| EP | 3699736 A1 | 8/2020 |
| WO | 2015192117 A1 | 12/2015 |

OTHER PUBLICATIONS

International Search Report and Written Opinion for International Application No. PCT/US2021/033642, dated Aug. 30, 2021 (dated Aug. 30, 2021)—11 pages.

Cas and Chary VR: https://www.youtube.com/watch?_8VqQfrHG94 , viewed on Dec. 4, 2021, published online on Feb. 25, 2020 (Year: 2020).

Engadget: "Google Glass Gesture Recognition by OnTheGo Platforms at CES 2014 : Engadget", Jan. 8, 2014 (Jan. 8, 2014), XP055859805, Retrieved from the Internet: URL:https://www.youtube.com/watch?v=d_jl_ZxPECg [retrieved on Nov. 11, 2021] 00:39s, 00:55s, 01:00-01:10s.

International Search Report and Written Opinion for International Application No. PCT/US2021/051109, dated Dec. 10, 2021 (dated Oct. 12, 2021)—17 pages.

Matthias Schwaller et al: "Pointing in the Air: Measuring the Effect of Hand Selection Strategies on Performance and Effort", Jul. 1, 2013 (Jul. 1, 2013), Human Factors in Computing and Informatics, Springer Berlin Heidelberg, Berlin, Heidelberg, pp. 732-747, XP047033542, ISBN: 978-3-642-39061-6, p. 740; figure 4.

Cirulis Arnis: "Large Scale Augmented Reality for Collaborative Environments", Jul. 10, 2020 (Jul. 10, 2020), Computer Vision—ECCV 2020 : 16th European Conference, Glasgow, UK, Aug. 23-28, 2020 : Proceedings; [Lecture Notes in Computer Science ; ISSN 0302-9743], Springer International Publishing, Cham, pp. 325-335, XP047554326, ISBN: 978-3-030-58594-5.

International Search Report and Written Opinion for International Application No. PCT/US2021/063295, dated Mar. 17, 2022 (dated Mar. 17, 2022)—13 pages.

Chatain, Julia et al., "DigiGlo: Exploring the Palm as an Input and Display Mechanism through Digital Gloves," Association for Computing Machinery, CHI PLAY '20, Nov. 2-4, 2020, Virtual Event, Canada, 12 pages.

International Search Report and Written Opinion for International Application No. PCT/US2022/023608, dated Jul. 11, 2022 (dated Nov. 7, 2022)—12 pages.

International Search Report and Written Opinion for International Application No. PCT/US2022/024565, dated Jul. 25, 2022 (dated Jul. 25, 2022)—15 pages.

U.S. Appl. No. 17/589,065, filed Jan. 31, 2022 to Stotzenberg.
U.S. Appl. No. 17/714,352, filed Apr. 6, 2022 to Hwang et al.
U.S. Appl. No. 17/719,654, filed Apr. 13, 2022 to Hwang et al.

* cited by examiner

TOUCHLESS PHOTO CAPTURE IN RESPONSE TO DETECTED HAND GESTURES

TECHNICAL FIELD

Examples set forth in the present disclosure relate to the field of augmented reality (AR) and wearable electronic devices such as eyewear. More particularly, but not by way of limitation, the present disclosure describes the real-time tracking of hand gestures and the display of virtual objects in augmented reality.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems (e.g., touch-sensitive surfaces, pointers), peripheral devices, displays, and graphical user interfaces (GUIs) through which a user can interact with displayed content.

Augmented reality (AR) combines real objects in a physical environment with virtual objects and displays the combination to a user. The combined display gives the impression that the virtual objects are authentically present in the environment, especially when the virtual objects appear and behave like the real objects.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
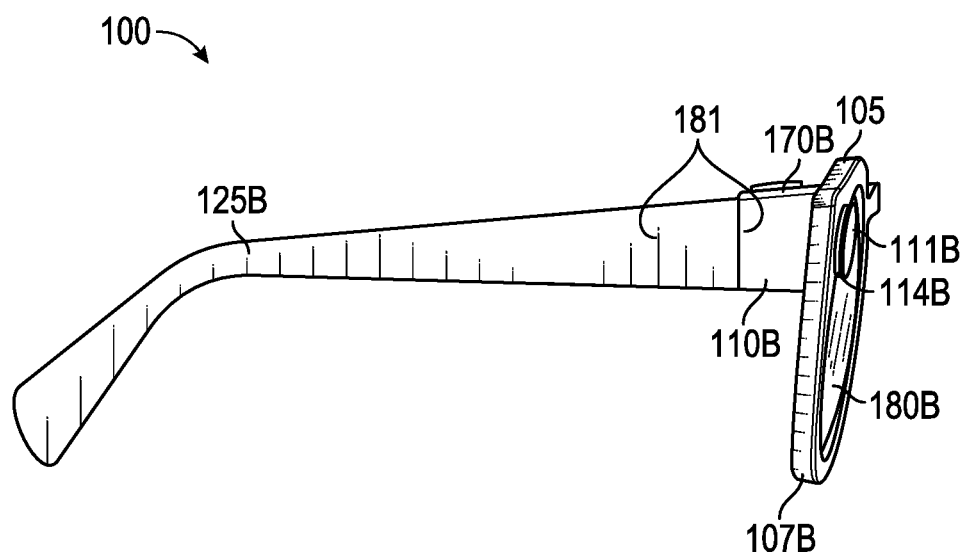
FIG. 1A is a side view (right) of an example hardware configuration of an eyewear device suitable for use in an image capture system.

Various implementations and details are described with reference to examples, including a method of capturing still images in response to hand gestures detected with an eyewear device. The eyewear device includes a camera system, an image processing system, a localization system, and a display. The method includes capturing frames of video data with the camera system, wherein each frame of video data comprises depth information for a plurality of pixels. The method further includes determining an eyewear location relative to a physical environment with the localization system and detecting a hand shape in the captured frames of video data with the image processing system. The method further includes determining whether the detected hand shape in a first frame matches a shutter gesture and then capturing a still image within a capture frame of the video data associated with the first frame.

In some examples, the method includes, in response to the detected shutter gesture, presenting an indicator on the display. The method further includes determining a shutter gesture location relative to the physical environment with the localization system, wherein the shutter gesture location is associated with the detected hand shape matching the shutter gesture. The method further includes presenting the captured still image on the display near the shutter gesture location, such that the still image appears anchored relative to the physical environment.

Although the various systems and methods are described herein with reference to capturing sill images with an eyewear device, the technology described may be applied to selecting and capturing still images from a sequence of frames of video data that were captured by other devices.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Advanced AR technologies, such as computer vision and object tracking, may be used to create a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. Hand and finger recognition and tracking in real time is one of the most challenging and processing-intensive tasks in the field of computer vision.

The term "pose" refers to the static position and orientation of an object at a particular instant in time. The term "gesture" refers to the active movement of an object, such as a hand, through a series of poses, sometimes to convey a signal or idea. The terms, pose and gesture, are sometimes used interchangeably in the field of computer vision and augmented reality. As used herein, the terms "pose" or "gesture" (or variations thereof) are intended to be inclusive of both poses and gestures; in other words, the use of one term does not exclude the other.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
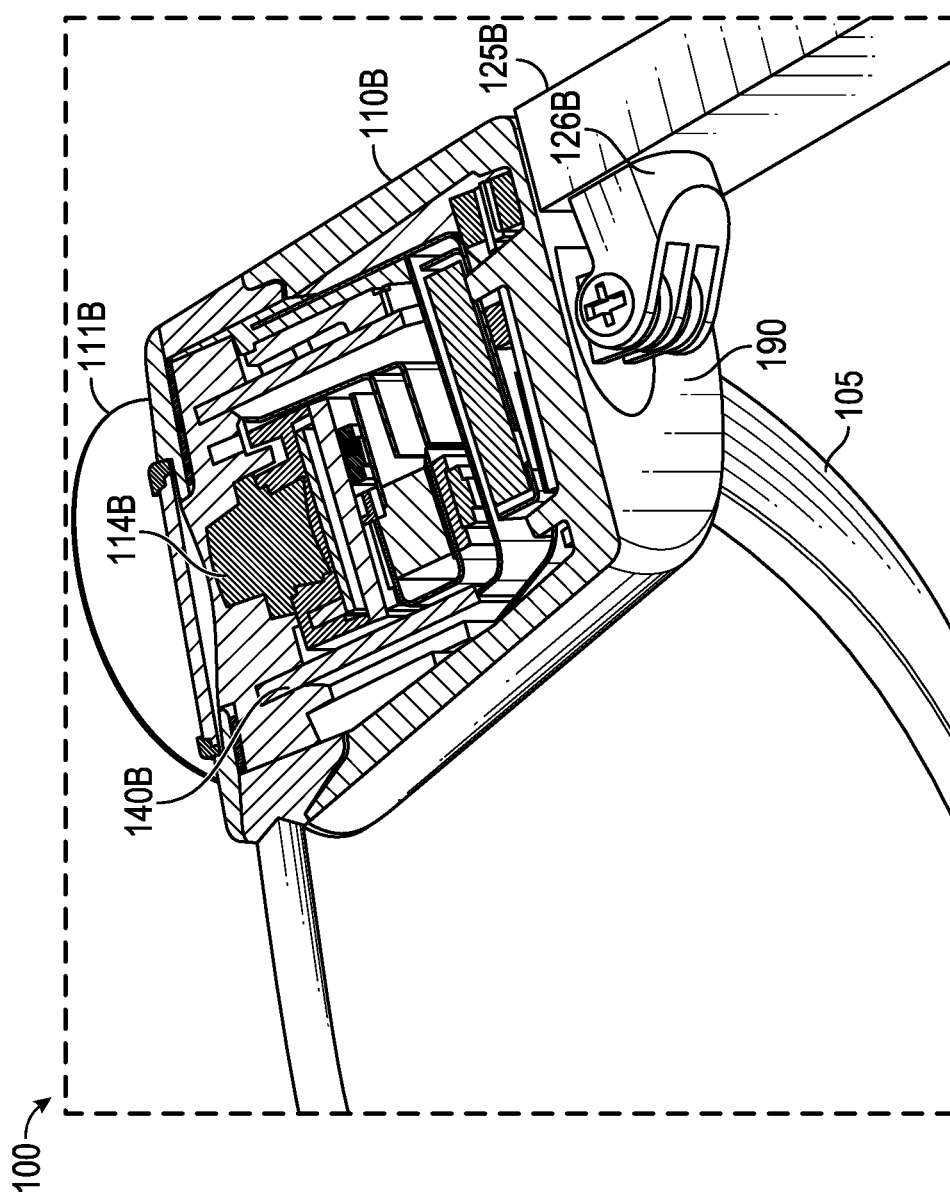
FIG. 1B is a perspective, partly sectional view of a right corner of the eyewear device of FIG. 1A depicting a right visible-light camera, and a circuit board.
Figure 1C:
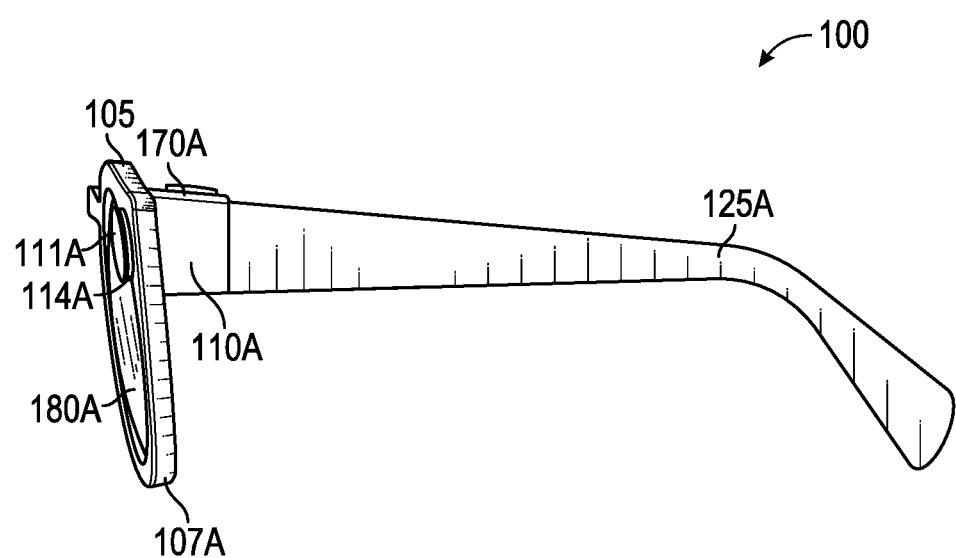
FIG. 1C is a side view (left) of an example hardware configuration of the eyewear device of FIG. 1A, which shows a left visible-light camera.
Figure 1D:
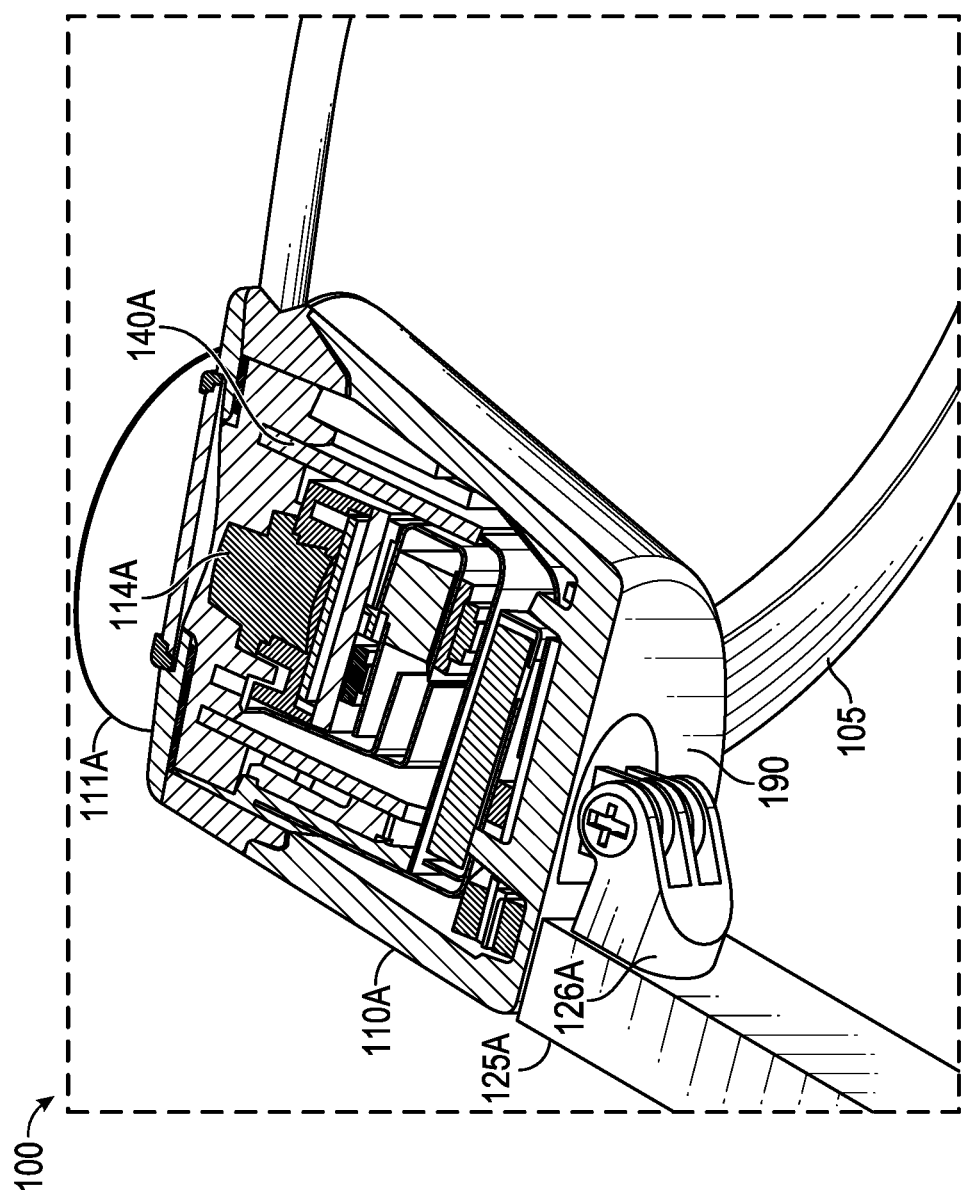
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
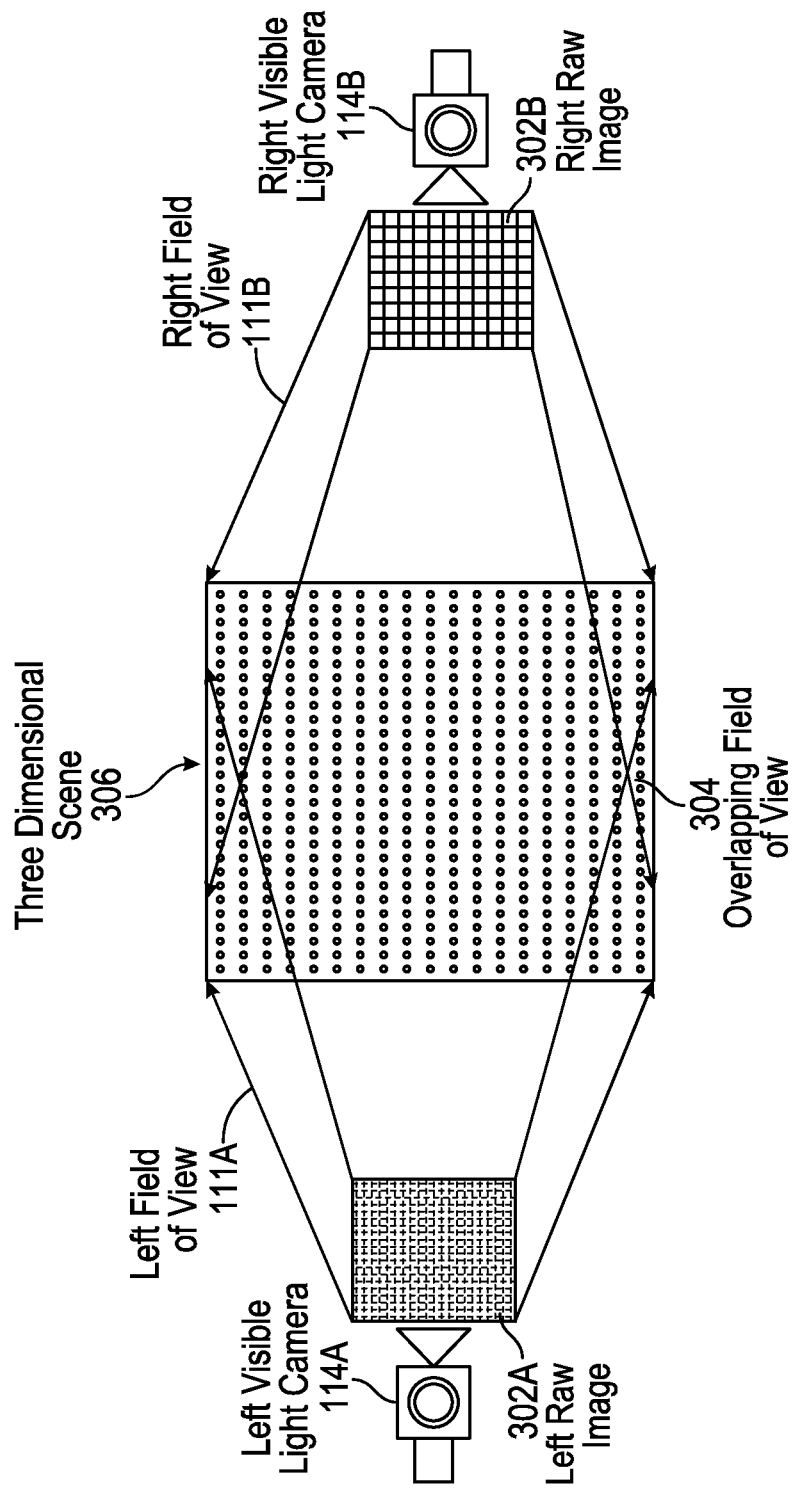
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 480p (e.g., 640×480 pixels), 720p, 1080p, or greater. Other examples include visible-light cameras 114A, 114B that can capture high-definition (HD) video at a high frame rate (e.g., thirty to sixty frames per second, or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). A right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B. A left hinge 126B connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
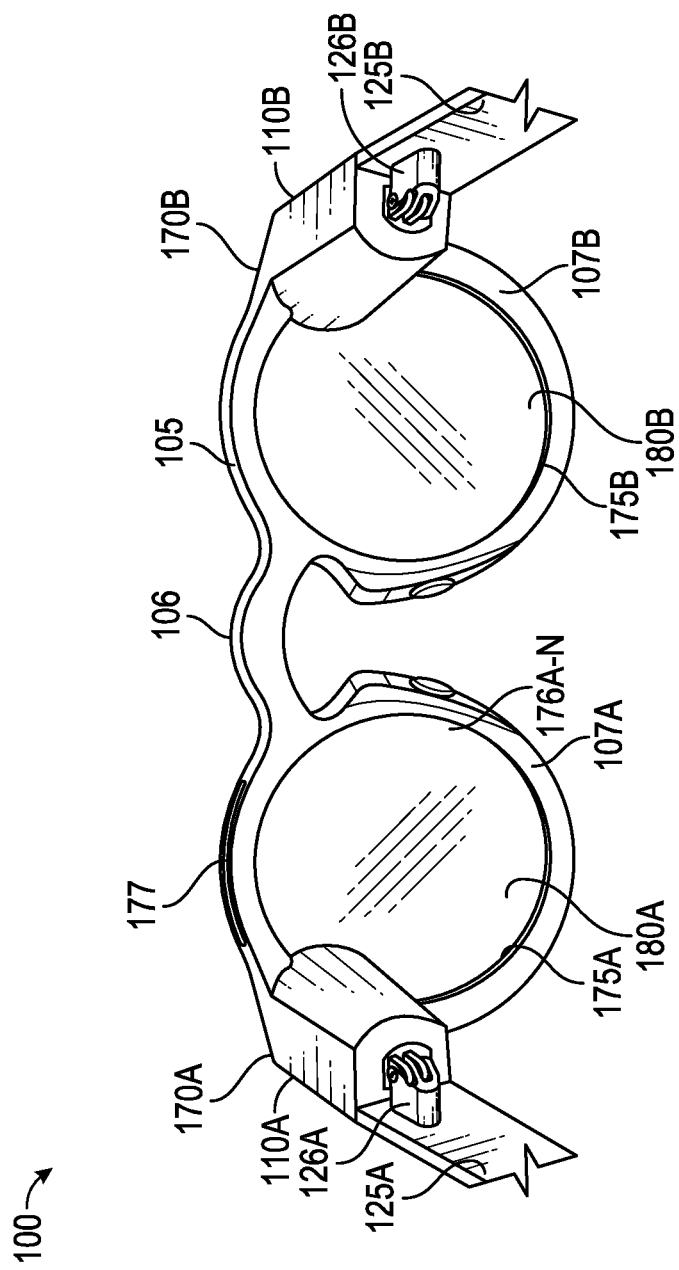
FIGS. 2A and 2B are rear views of example hardware configurations of an eyewear device utilized in the image capture system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
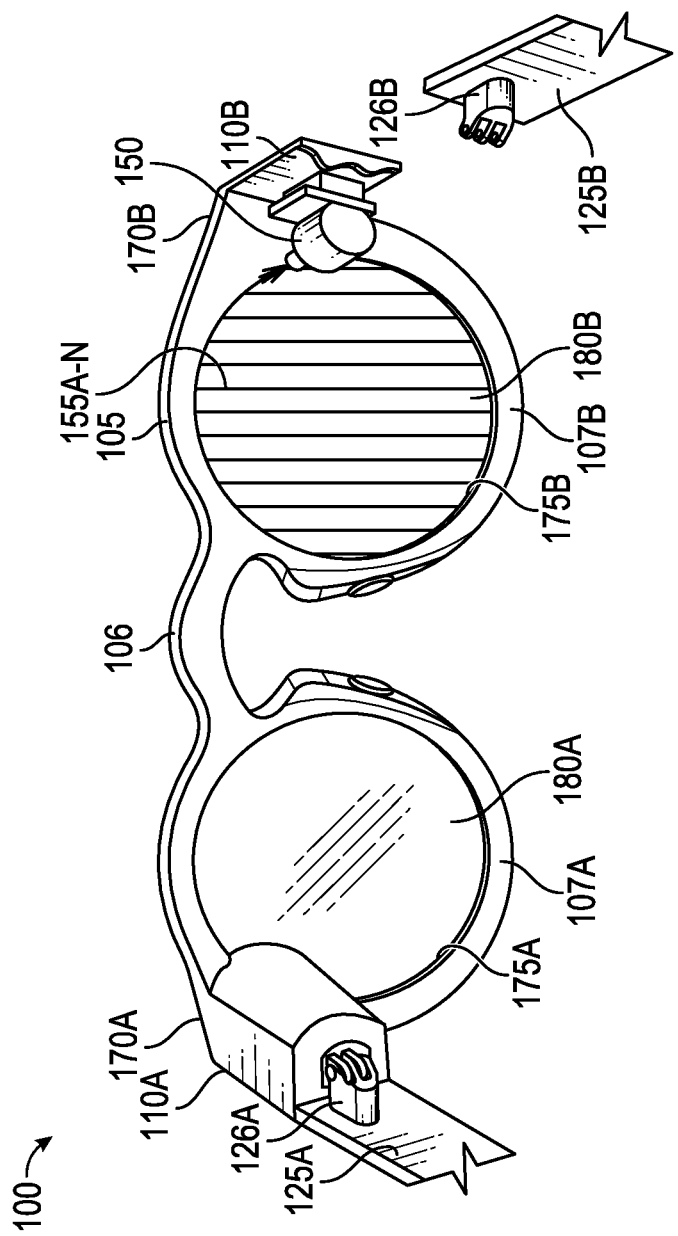

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge or diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double prime, A through N, not shown) which are configured to interact with light from the right projector 150B. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the image capture system 400 (FIG. 4) includes the eyewear device 100, which includes a frame 105 and a left temple 125A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 125A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
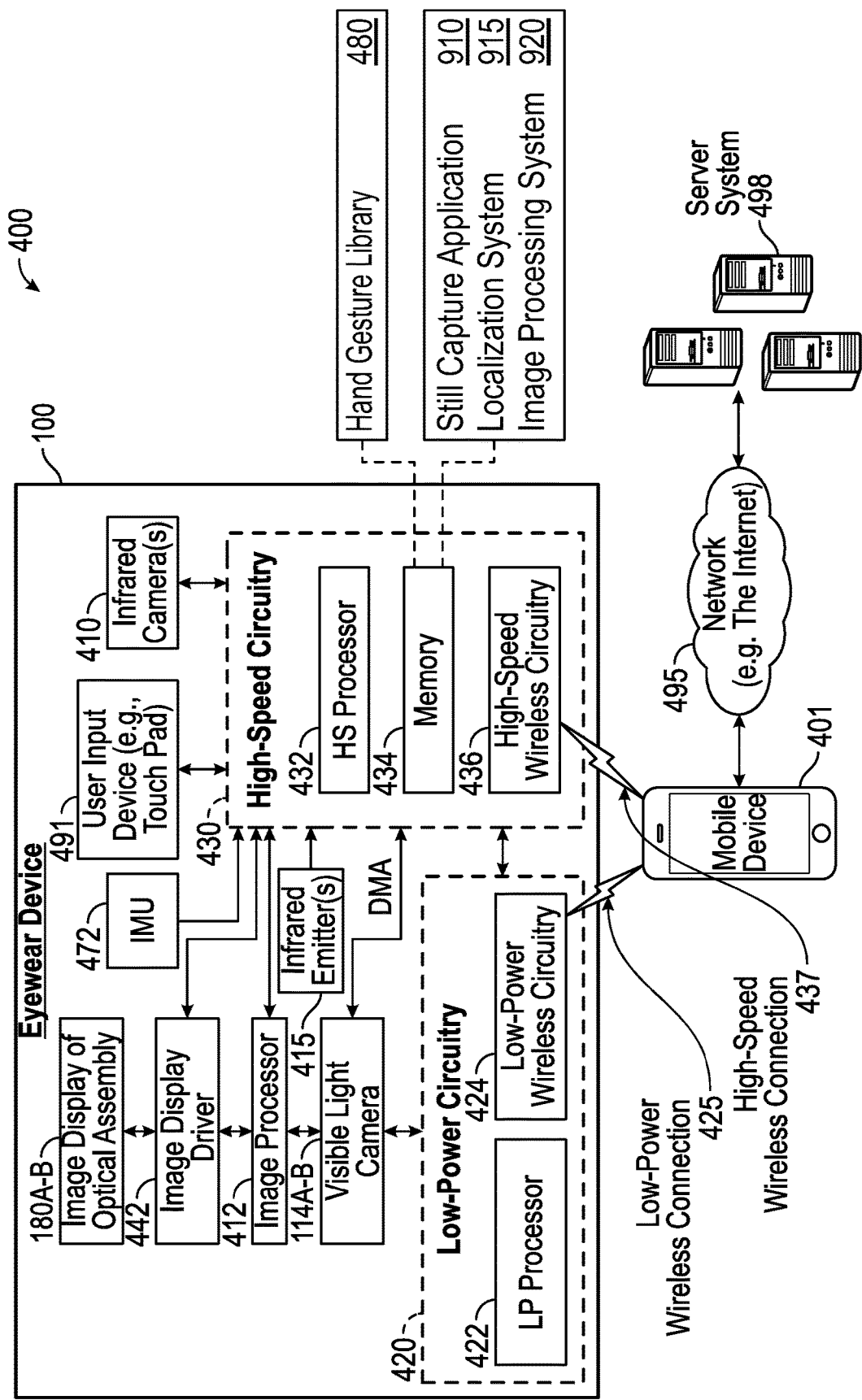
FIG. 4 is a functional block diagram of an example image capture system including a wearable device (e.g., an eyewear device) and a server system connected via various networks.

FIG. 4 is a functional block diagram of an example image capture system 400 that includes a wearable device (e.g., an eyewear device 100), a mobile device 401, and a server system 498 connected via various networks 495 such as the Internet. As shown, the image capture system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more speakers 440 (e.g., one associated with the left side of the eyewear device and another associated with the right side of the eyewear device). The speakers 440 may be incorporated into the frame 105, temples 125, or corners 110 of the eyewear device 100. The one or more speakers 440 are driven by audio processor 443 under control of low-power circuitry 420, high-speed circuitry 430, or both. The speakers 440 are for presenting audio signals including, for example, a beat track. The audio processor 443 is coupled to the speakers 440 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
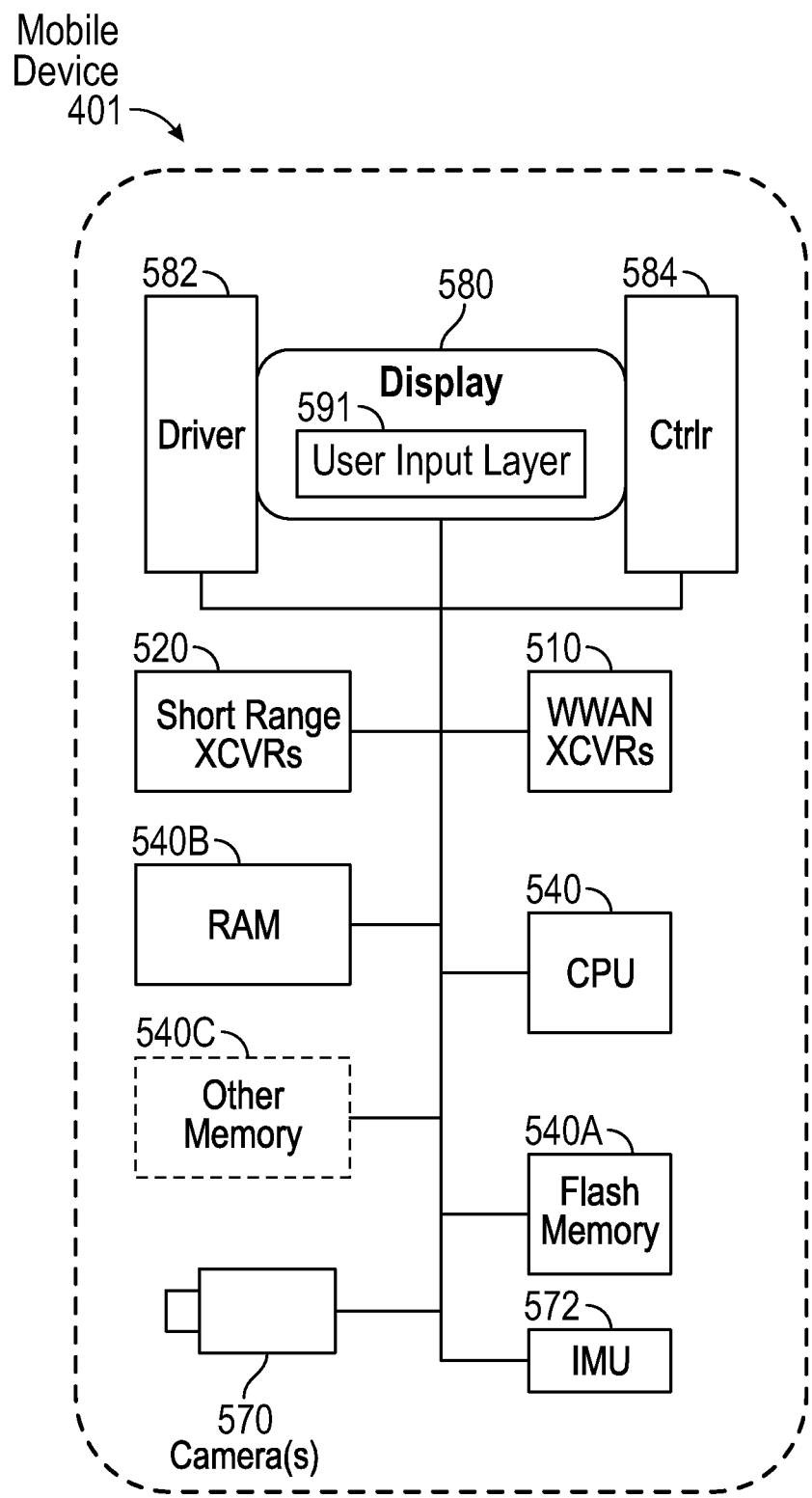
FIG. 5 is a diagrammatic representation of an example hardware configuration for a mobile device of the image capture system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The image capture system 400, as shown in FIG. 4, includes a computing device, such as mobile device 401, coupled to an eyewear device 100 over a network. The image capture system 400 includes a memory for storing instructions and a processor for executing the instructions. Execution of the instructions of the image capture system 400 by the processor 432 configures the eyewear device 100 to cooperate with the mobile device 401. The image capture system 400 may utilize the memory 434 of the eyewear device 100 or the memory elements 540A, 540B, 540C of the mobile device 401 (FIG. 5). Also, the image capture system 400 may utilize the processor elements 432, 422 of the eyewear device 100 or the central processing unit (CPU) 530 of the mobile device 401 (FIG. 5). In addition, the image capture system 400 may further utilize the memory and processor elements of the server system 498. In this aspect, the memory and processing functions of the image capture system 400 can be shared or distributed across the eyewear device 100, the mobile device 401, and the server system 498.

The memory 434, in some example implementations, includes a hand gesture library 480. The library of hand gestures 480 includes a large number of poses and gestures, with the hand in various positions and orientations. The stored poses and gestures are suitable for ready comparison to a hand shape that is detected in an image. The library 480 includes three-dimensional coordinates for a large number of landmarks, from the wrist to the fingertips. For example, a hand gesture record stored in the library 480 may include a hand gesture identifier (e.g., pointing finger, thumb and finger making an L-shape, closed fist, open palm, relaxed hand, grasping an object, pinching, spreading), a point of view or a directional reference (e.g., palmar side visible, dorsal, lateral), and other information about orientation, along with three-dimensional coordinates for the wrist, the fifteen interphalangeal joints, the five fingertips and other skeletal or soft-tissue landmarks. The process of detecting a hand shape, in some implementations, involves comparing the pixel-level data in one or more captured frames of video data to the hand gestures stored in the library 480 until a good match is found.

The memory 434 additionally includes, in some example implementations, a still capture application 910, a localization system 915, and in image processing system 920. In an image capture system 400 in which a camera is capturing frames of video data, the still capture application 910 configures the processor 432 to capture a still image within a frame of the captured video data in response to detecting a hand shape that substantially matches a shutter gesture (e.g., touching the index finger to the thumb). The localization system 915 configures the processor 432 to obtain localization data for use in determining the position of the eyewear device 100 relative to the physical environment. The localization data may be derived from a series of images, an IMU unit 472, a GPS unit 473, or a combination thereof. The image processing system 920 configures the processor 432 to present a captured still image on a display of an optical assembly 180A, 180B in cooperation with the image display driver 442 and the image processor 412.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 891 for receiving input (by touch, multi-touch, or gesture, and the like, by hand, stylus or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP)

network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. Sensor data includes images received from one or both of the cameras 114A, 114B, distance(s) received from a laser range finder, position information received from a GPS unit 473, motion and acceleration data received from an IMU 572, or a combination of data from such sensors, or from other sensors that provide data useful in determining positional information. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate; in other words, calculating and updating the mapping and localization thirty times per second.

Sensor data includes image(s) received from one or both cameras 114A, 114B, distance(s) received from a laser range finder, position information received from a GPS unit 473, motion and acceleration data received from an IMU 472, or a combination of data from such sensors, or from other sensors that provide data useful in determining positional information.

Figure 6:
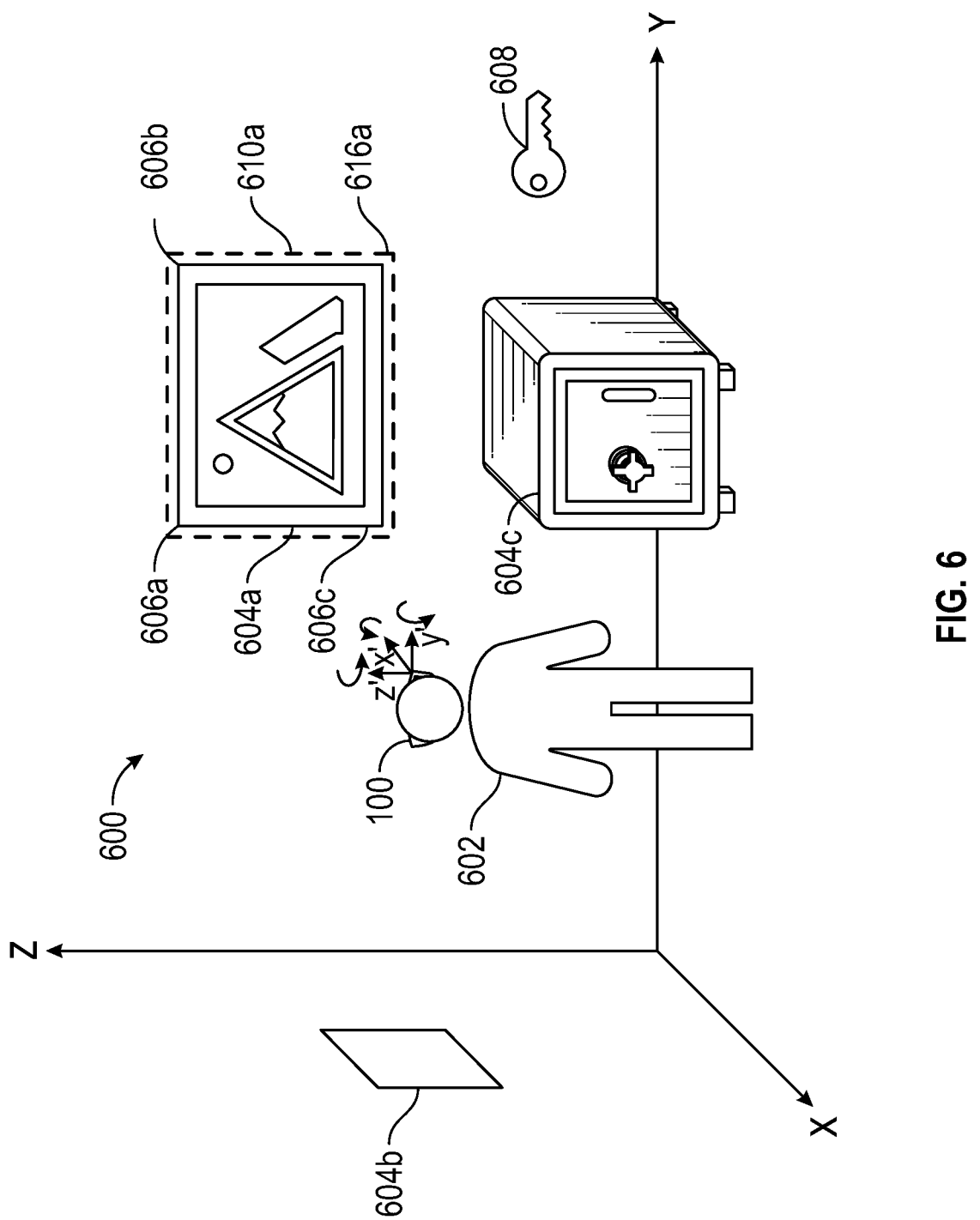
FIG. 6 is a schematic illustration of a user in an example environment for use in describing simultaneous localization and mapping.

FIG. 6 depicts an example physical environment 600 along with elements that are useful for natural feature tracking (NFT; e.g., a tracking application using a SLAM algorithm). A user 602 of eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606a, 606b, and 606c) associated with a single object 604a, or by using one or more location points 606 associated with two or more objects 604a, 604b, 604c. The processor 432 of the eyewear device 100 may position a virtual object 608 (such as the key shown in FIG. 6) within the environment 600 for viewing during an augmented reality experience.

The localization system 915 in some examples a virtual marker 610a associated with a virtual object 608 in the environment 600. In augmented reality, markers are registered at locations in the environment to assist devices with the task of tracking and updating the location of users, devices, and objects (virtual and physical) in a mapped environment. Markers are sometimes registered to a high-contrast physical object, such as the relatively dark object, such as the framed picture 604a, mounted on a lighter-colored wall, to assist cameras and other sensors with the task of detecting the marker. The markers may be preassigned or may be assigned by the eyewear device 100 upon entering the environment.

Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610a, the marker's position (location and orientation), one or more virtual objects, or a combination thereof. The marker position may include three-dimensional coordinates for one or more marker landmarks 616a, such as the corner of the generally rectangular marker 610a shown in FIG. 6. The marker location may be expressed relative to real-world geographic coordinates, a system of marker coordinates, a position of the eyewear device 100, or other coordinate system. The one or more virtual objects associated with the marker 610a may include any of a variety of material, including still images, video, audio, tactile feedback, executable applications, interactive user interfaces and experiences, and combinations or sequences of such material. Any type of content capable of being stored in a memory and retrieved when the marker 610a is encountered or associated with an assigned marker may be classified as a virtual object in this context. The key 608 shown in FIG. 6, for example, is a virtual object displayed as a still image, either 2D or 3D, at a marker location.

In one example, the marker 610a may be registered in memory as being located near and associated with a physical object 604a (e.g., the framed work of art shown in FIG. 6). In another example, the marker may be registered in memory as being a particular position with respect to the eyewear device 100.

Figure 7:
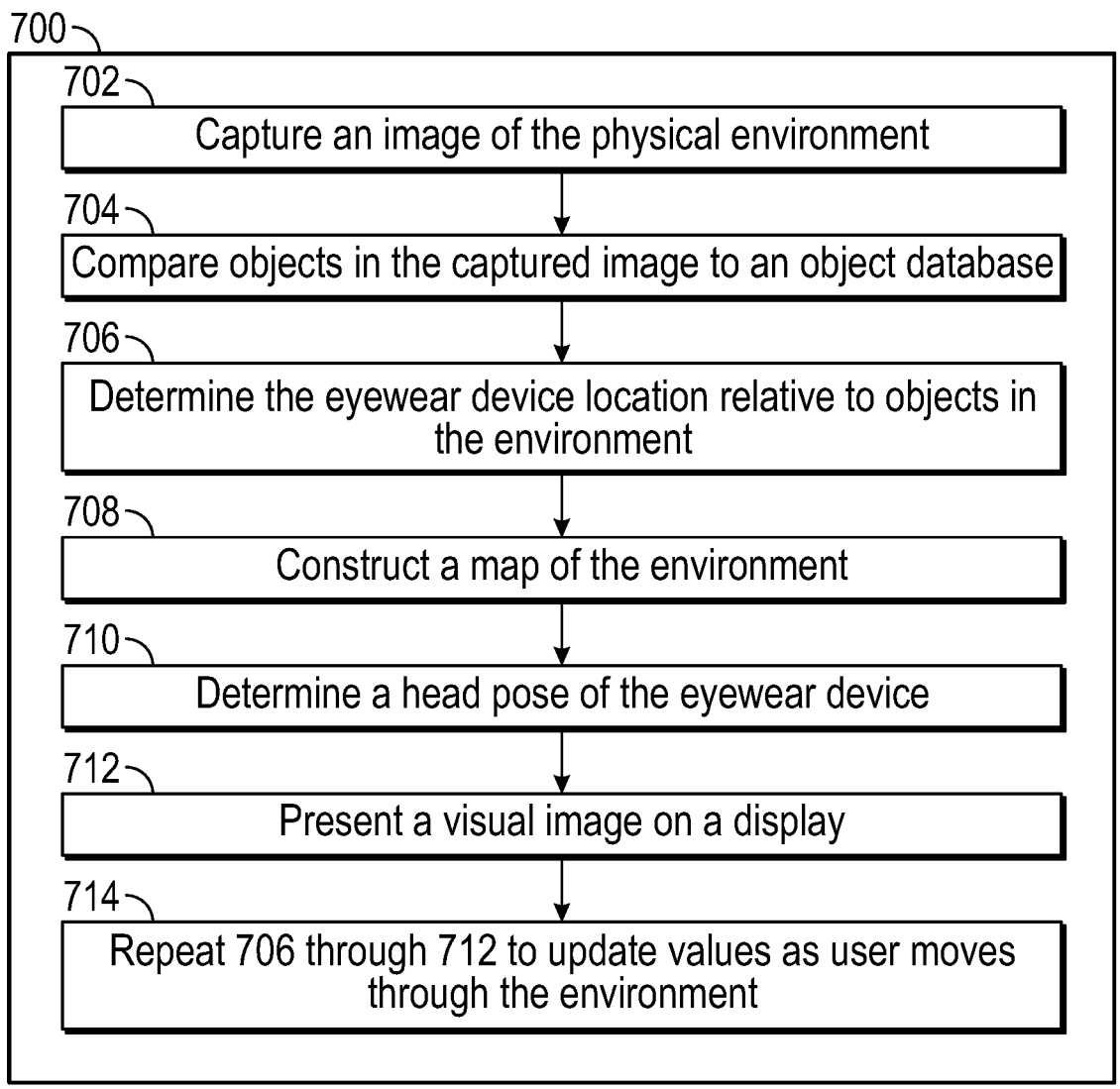
FIG. 7 is a flow chart listing steps in an example method of displaying virtual objects in a physical environment.

FIG. 7 is a flow chart 700 depicting a method for implementing augmented reality applications described herein on a wearable device (e.g., an eyewear device). Although the steps are described with reference to the eyewear device 100, as described herein, other implementations of the steps described, for other types of devices, will be understood by one of skill in the art from the description herein. Additionally, it is contemplated that one or more of the steps shown in FIG. 7, and in other figures, and described herein may be omitted, performed simultaneously or in a series, performed in an order other than illustrated and described, or performed in conjunction with additional steps.

At block 702, the eyewear device 100 captures one or more input images of a physical environment 600 near the eyewear device 100. The processor 432 may continuously receive input images from the visible light camera(s) 114 and store those images in memory 434 for processing. Additionally, the eyewear device 100 may capture information from other sensors (e.g., location information from a GPS unit 473, orientation information from an IMU 472, or distance information from a laser distance sensor).

At block 704, the eyewear device 100 compares objects in the captured images to objects stored in a library of images to identify a match. In some implementations, the processor 432 stores the captured images in memory 434. A library of images of known objects is stored in a virtual object database 484.

In one example, the processor 432 is programmed to identify a predefined particular object (e.g., a particular picture 604a hanging in a known location on a wall, a window 604b in another wall, or an object such as a safe 604c positioned on the floor). Other sensor data, such as GPS data, may be used to narrow down the number of known objects for use in the comparison (e.g., only images associated with a room identified through GPS coordinates). In another example, the processor 432 is programmed to identify predefined general objects (such as one or more trees within a park).

At block 706, the eyewear device 100 determines its position with respect to the object(s). The processor 432 may determine its position with respect to the objects by comparing and processing distances between two or more points in the captured images (e.g., between two or more location points on one objects 604 or between a location point 606 on each of two objects 604) to known distances between corresponding points in the identified objects. Distances between the points of the captured images greater than the points of the identified objects indicates the eyewear device 100 is closer to the identified object than the imager that captured the image including the identified object. On the other hand, distances between the points of the captured images less than the points of the identified objects indicates the eyewear device 100 is further from the identified object than the imager that captured the image including the identified object. By processing the relative distances, the processor 432 is able to determine the position within respect to the objects(s). Alternatively, or additionally, other sensor information, such as laser distance sensor information, may be used to determine position with respect to the object(s).

At block 708, the eyewear device 100 constructs a map of an environment 600 surrounding the eyewear device 100 and determines its location within the environment. In one example, where the identified object (block 704) has a predefined coordinate system (x, y, z), the processor 432 of the eyewear device 100 constructs the map using that predefined coordinate system and determines its position within that coordinate system based on the determined positions (block 706) with respect to the identified objects. In another example, the eyewear device constructs a map using images of permanent or semi-permanent objects 604 within an environment (e.g., a tree or a park bench within a park). In accordance with this example, the eyewear device 100 may define the coordinate system (x', y'z') used for the environment.

At block 710, the eyewear device 100 determines a head pose (roll, pitch, and yaw) of the eyewear device 100 within the environment. The processor 432 determines head pose by using two or more location points (e.g., three location points 606a, 606b, and 606c) on one or more objects 604 or by using one or more location points 606 on two or more objects 604. Using conventional image processing algorithms, the processor 432 determines roll, pitch, and yaw by comparing the angle and length of a lines extending between the location points for the captured images and the known images.

At block 712, the eyewear device 100 presents visual images to the user. The processor 432 presents images to the user on the image displays 180 using the image processor 412 and the image display driver 442. The processor develops and presents the visual images via the image displays responsive to the location of the eyewear device 100 within the environment 600.

At block 714, the steps described above with reference to blocks 706-712 are repeated to update the position of the eyewear device 100 and what is viewed by the user 602 as the user moves through the environment 600.

Figure 8A:
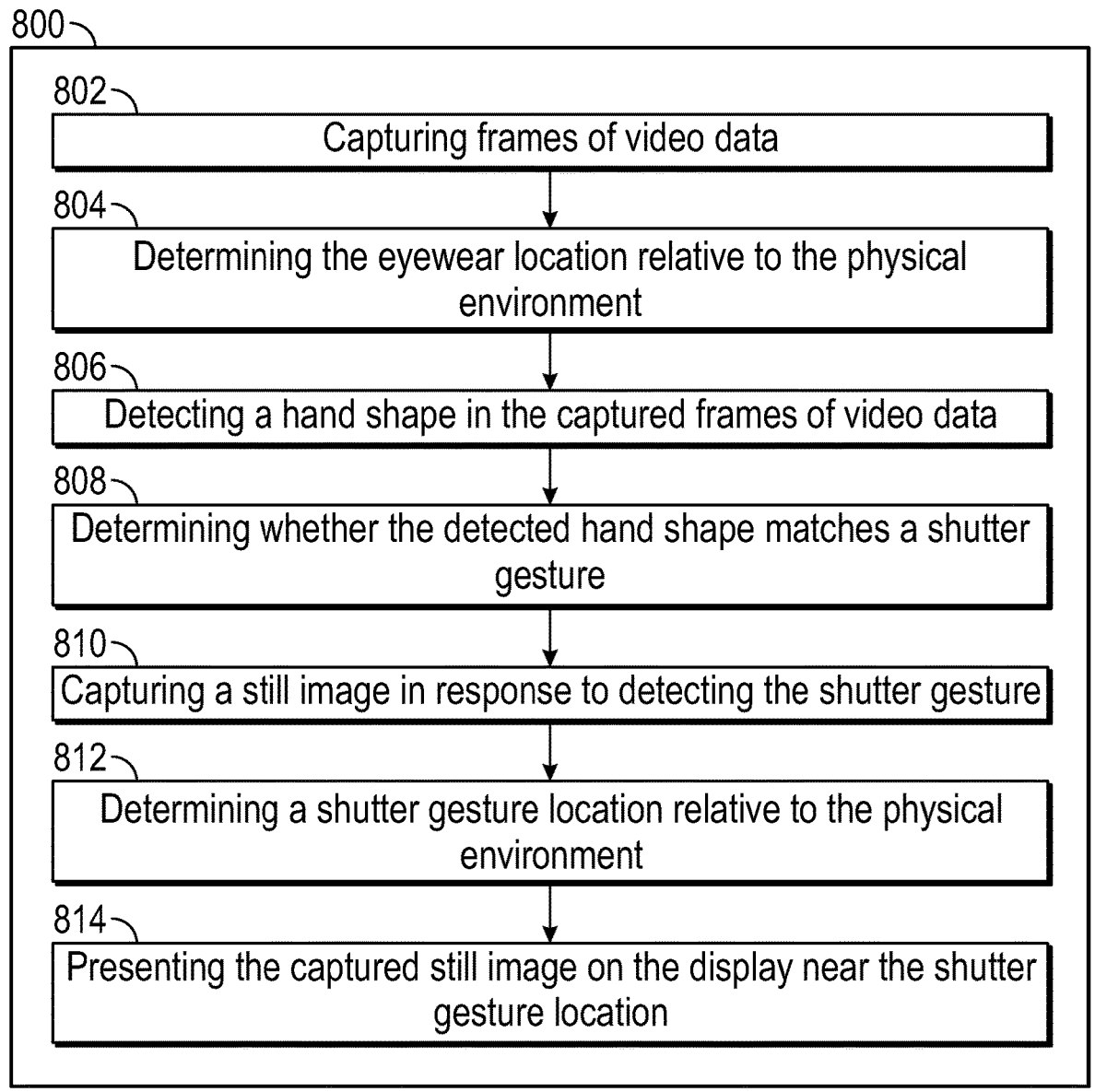
FIG. 8A is a flow chart listing the steps in an example method of capturing still images in response to hand gestures.

FIG. 8A is a flow chart 800 listing the steps in an example method of capturing a still image in response to a hand gesture. Although the steps are described with reference to the eyewear device 100, as described herein, other implementations of the steps described, for other types of wearable mobile devices, will be understood by one of skill in the art from the description herein. Additionally, it is contemplated that one or more of the steps shown and described may be omitted, performed simultaneously or in a series, performed in an order other than illustrated and described, or performed in conjunction with additional steps.

In FIG. 8A, at block 802, the processor 432 of an eyewear device 100 is configured to capture frames of video data with a camera 114A, 114B as the wearer moves through a physical environment. The camera 114A, 114B, in some implementations, includes one or more high-resolution, digital cameras equipped with a CMOS image sensor capable of capturing high-definition still images and high-definition video at rates as high as thirty frames per second. Each frame of digital video includes depth information for a plurality of pixels in the image. In this aspect, the camera 114A, 114B serves as a high-definition scanner by capturing a detailed input image of the physical environment according to the camera's field of view 111. The camera 114A, 114B, in some implementations, includes a pair of high-resolution digital cameras 114A, 114B coupled to the eyewear device 100 and spaced apart to acquire a left-camera raw image and a right-camera raw image. When combined, the raw images form an input image that includes a matrix of three-dimensional pixel locations. The method, at block 802, in some implementations, includes storing the captured frames of video data in memory 434 on the eyewear device 100, at least temporarily, such that the frames are available for analysis; for example, to determine position of the eyewear device 100 with respect to other objects in the physical environment and to track the movement of the eyewear device 100 through the environment.

At block 804, the processor 432 determines the location of the eyewear device 100 relative to the physical environment 600 using a localization system 915 as described herein. Movement of the eyewear device 100 changes the position and orientation from which the camera captures the frames of video data. The video data may be used to localize the position of the eyewear device 100 within the environment and update the position as the wearer/user moves through the environment. In this aspect, the processor 432 continually updates the current local position of the eyewear device 100 as the wearer moves relative to the physical environment, so that the virtual objects presented are persistently viewable in a logically authentic location relative to the physical environment. The localization system 915 may include a SLAM algorithm, as described herein, which updates a map of the environment 600 and the location of objects within it, including the eyewear device 100, at least as frequently as the frame rate of the video camera.

Figure 9A:
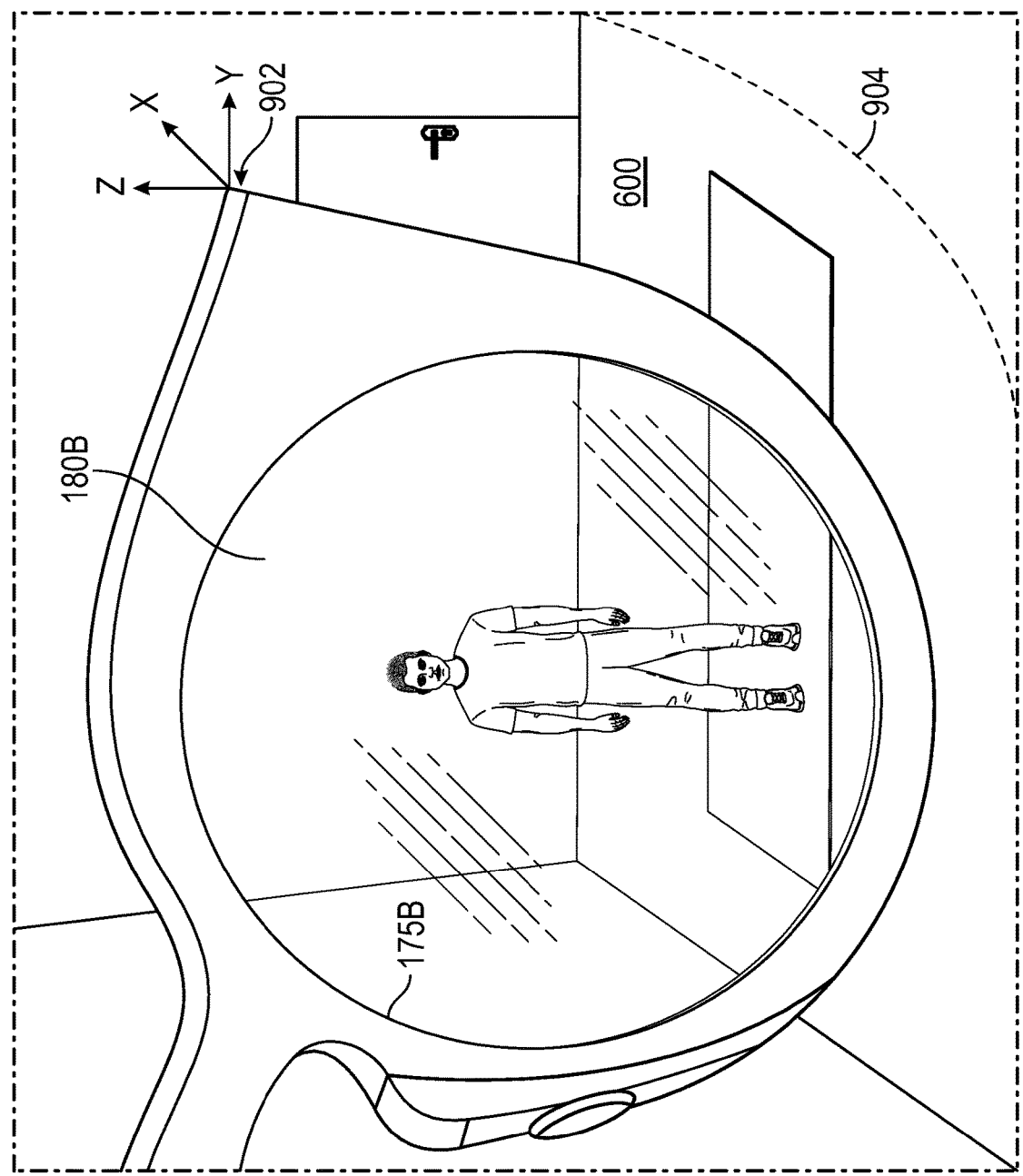
FIGS. 9A, 9B, 9C, and 9D are perspective illustrations of an example method of capturing still images in response to hand gestures.

FIG. 9A is a perspective illustration of an eyewear device located in a physical environment 600. The eyewear device includes a semi-transparent image display 180B which, as described herein, may include a semi-transparent lens layer and a display matrix layer configured to present images on the lens of the eyewear device. The image display 180B in some example implementations is at least partly defined by an aperture 175B in the eyewear frame. As shown, the wearer field of view 904 is generally wider than the aperture 175B for the display 180B. The camera field of view 111, as described herein, typically extends at least partly over the wearer field of view 904 and includes at least part of the view through the display 180B. At block 804, in some examples, the determined location 902 of the eyewear device 100 includes a set of coordinates, as shown in FIG. 9A, relative to the physical environment 600.

The localization system 915, in some example implementations, registers a marker location with respect to the current position of the eyewear device 100. Marker registration includes storing the marker location in memory, such as the memory 434. In one example, the marker location includes a set of three-dimensional marker coordinates based on or correlated with depth information obtained from a digital image or a frame of digital video. In another example, the marker location includes a set of three-dimensional marker coordinates based on or correlated with GPS information, with SLAM algorithm results, or with other types of positional information obtained by the processor 432. The marker location, in some implementations, coincides with an origin point (zero, zero, zero) for a marker coordinate system. The marker coordinate system may be used as a reference for the marker location as well as a variety of other locations on or near where the marker is placed. In one example, the origin point corresponds to the eyewear device 100 and all marker positions are defined with respect to the eyewear device 100.

At block 806, the processor 432 detects a hand shape in the captured frames of video data. In some example implementations, an image processing system 412 analyzes the pixel-level video data in each captured frame to determine if the frame includes a human hand and, if so, whether the frame includes a particular hand gesture. The data in the frame is compared to a large number of hand poses and gestures stored in a library of hand gestures 480.

Figure 9B:
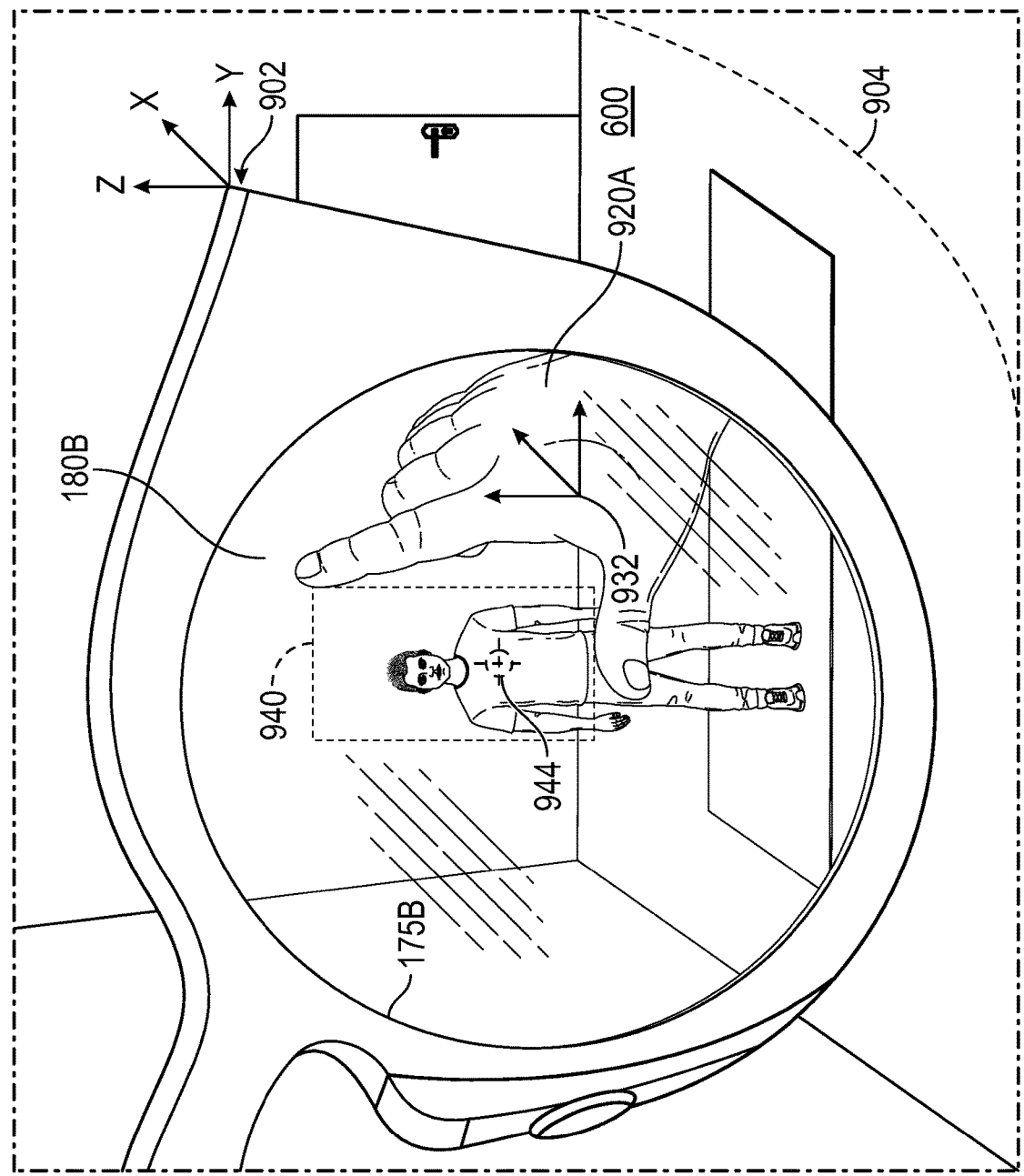
Figure 9C:
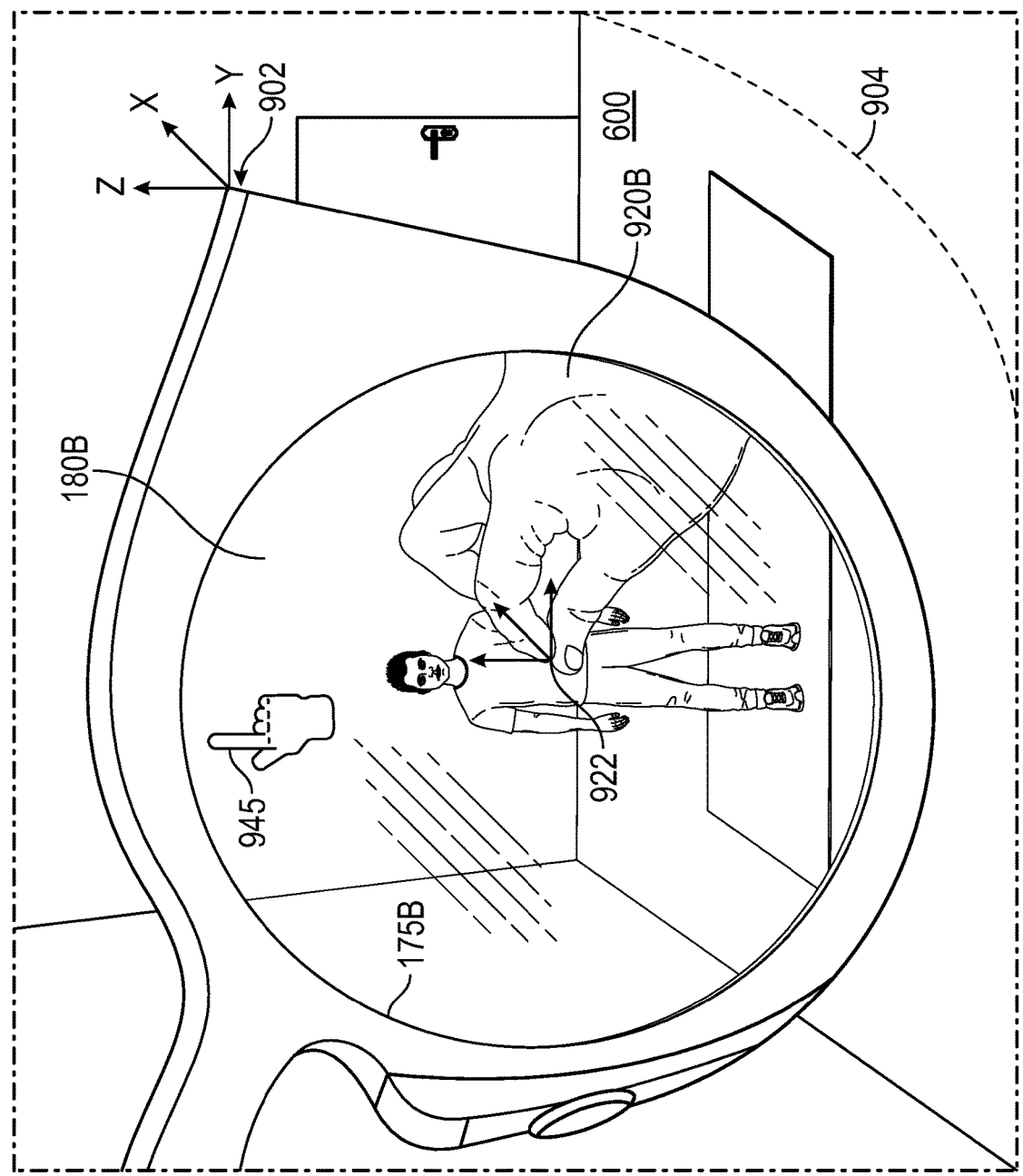

At block 808, the processor 432 determines whether a detected hand shape substantially matches a shutter gesture. As used herein, a shutter gesture is a hand pose or gesture which, when detected, indicates that the user wishes to capture a still image. The shutter gesture operates like pressing the shutter button on a camera, but it is unlike a shutter button because there is no camera shutter involved. The still image is captured from the video data, not by a camera taking an additional still image. The shutter gesture and its parameters may be stored in memory or in the hand gesture library 480. The shutter gesture, in one example, is a hand shape in which the index finger is extended and appears to tap an imaginary plane, such as an imaginary pane of glass. The shutter gesture, in another example, is a hand shape 920B in which the index finger touches the thumb in a relatively quick pinching motion, as shown in FIG. 9C, and is followed by a release or reversal of the touching. Any of a variety of hand poses or gestures may be selected as an operative shutter gesture and saved in memory.

The process of determining whether a detected hand shape matches a shutter gesture, in some implementations, involves comparing the pixel-level data about the hand shape in one or more captured frames of video data to the collection of hand gestures identified as a shutter gesture and stored in the hand gesture library 480. The detected hand shape data may include three-dimensional coordinates for the wrist, up to fifteen interphalangeal joints, up five fingertips, and other skeletal or soft-tissue landmarks found in a captured frame. These data are compared to hand gesture data stored in the hand gesture library 480 until the best match is found. In some examples, the process includes calculating the sum of the geodesic distances between the detected hand shape fingertip coordinates and a set of fingertip coordinates for each hand gesture stored in the library 480. A sum is within a configurable threshold accuracy value represents a match.

In another example implementation, the process of determining whether a detected hand shape matches a shutter gesture, involves using a machine-learning algorithm to compare the pixel-level data about the hand shape in one or more captured frames of video data to a collection of images that include hand gestures.

Machine learning refers to an algorithm that improves incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

In the context of computer vision, mathematical models attempt to emulate the tasks accomplished by the human visual system, with the goal of using computers to extract information from an image and achieve an accurate understanding of the contents of the image. Computer vision algorithms have been developed for a variety of fields, including artificial intelligence and autonomous navigation, to extract and analyze data in digital images and video.

Deep learning refers to a class of machine-learning methods that are based on or modeled after artificial neural networks. An artificial neural network is a computing system made up of a number of simple, highly interconnected processing elements (nodes), which process information by their dynamic state response to external inputs. A large artificial neural network might have hundreds or thousands of nodes.

A convolutional neural network (CNN) is a type of neural network that is frequently applied to analyzing visual images, including digital photographs and video. The connectivity pattern between nodes in a CNN is typically modeled after the organization of the human visual cortex, which includes individual neurons arranged to respond to overlapping regions in a visual field. A neural network that is suitable for use in the determining process described herein is based on one of the following architectures: VGG16, VGG19, ResNet50, Inception V3, Xception, or other CNN-compatible architectures.

In the machine-learning example, at block 808, the processor 432 determines whether a detected hand shape substantially matches a shutter gesture using a machine-trained algorithm referred to as a hand feature model. The processor 432 is configured to access the hand feature model, trained through machine learning, and applies the hand feature model to identify and locate features of the hand shape in one or more frames of the video data.

In one example implementation, the trained hand feature model receives a frame of video data which contains a detected hand shape and abstracts the image in the frame into layers for analysis. Data in each layer is compared to hand gesture data stored in the hand gesture library 480, layer by layer, based on the trained hand feature model, until a good match is identified.

In one example, the layer-by-layer image analysis is executed using a convolutional neural network. In a first convolution layer, the CNN identifies learned features (e.g., hand landmarks, sets of joint coordinates, and the like). In a second convolution layer, the image is transformed into a plurality of images, in which the learned features are each accentuated in a respective sub-image. In a pooling layer, the sizes and resolution of the images and sub-images are reduced in order isolation portions of each image that include a possible feature of interest (e.g., a possible palm shape, a possible finger joint). The values and comparisons of images from the non-output layers are used to classify the image in the frame. Classification, as used herein, refers to the process of using a trained model to classify an image according to the detected hand shape. For example, an image may be classified as "shutter gesture present" if the detected hand shape matches the shutter gesture form the library 480.

In some example implementations, at block 808, the processor 432, in response to detecting a shutter gesture, presents on the display 180B an indicator 945. The indicator 945 informs the wearer that a shutter gesture has been detected and the system will next capture a still image. The indicator 945 in one example is an object, such as the pointing finger shown in FIG. 9C. In another example, the indicator 945 is a simulated shutter effect, such as a brief flash or the display of a shutter quickly closing and opening or a shutter-like sound emitted from one or more speakers 440 on the eyewear device 100. The indicator 945 may include one or more visible, audible, tactile, and other elements to inform or alert the wearer that a shutter gesture has been detected. For reference, the shutter gesture is associated with a first frame of the captured frames of video data.

At block 810, the processor 432, in response to detecting a shutter gesture, captures a still image from a portion of a capture frame of the video data. The capture frame, in one example implementation, is the first frame (associated with the detected shutter gesture).

In another example implementation, the capture frame is selected from a subset of the frames immediately preceding or following the first frame. Depending on the size and location of the still image within the capture frame, and the location of the shutter gesture, the finger or hand shape may also be part of the captured still image, which is generally unwanted. Recall that the camera may be capturing thirty frames per second. The finger or hand shape is likely not present, in the still image area, in one or more of the frames in the subset. Selecting one of the frames in the subset as the capture frame results in a still image that does not include the finger or hand shape. In another example implementation, post-processing removes the finger or hand shape from the still image; for example, by using data from the subset of frames to replace the finger or hand shape.

In some implementations, the still image has a default size, shape, and orientation. For example, the default may be a rectangle, having a size or aspect ratio the corresponds to a standard photo print size (e.g., an aspect ratio of 6:4, corresponding to a print size of six by four inches), in a portrait orientation with the longer edge generally vertical relative to the display.

The center of the still image, within the capture frame, in some implementations, is near the location of the shutter gesture relative to the physical environment, which is determined at block 812 using the localization system 915. The localization system 915 may employ a SLAM algorithm, as described herein, which updates a map of the environment 600 and the location of objects within it, as frequently as thirty times per second, or more. For example, the location of a desired photographic subject, such as a person nearby as shown in FIG. 9C, relative to the physical environment 600, is updated thirty times per second. The location of the hand shape 920B is likewise updated thirty times per second. When the image processing system 412 detects that the hand shape substantially matches the shutter gesture, the image processing system 412 saves the capture frame (containing the shutter gesture) and the localization system 915 determines and saves the location of the shutter gesture, relative to the physical environment. The shutter gesture location 922, in this example, is used as the center of the still image 950 to be captured. As a result, the still image 950 is centered near the person nearby and has a default size, shape, and orientation.

Figure 9D:
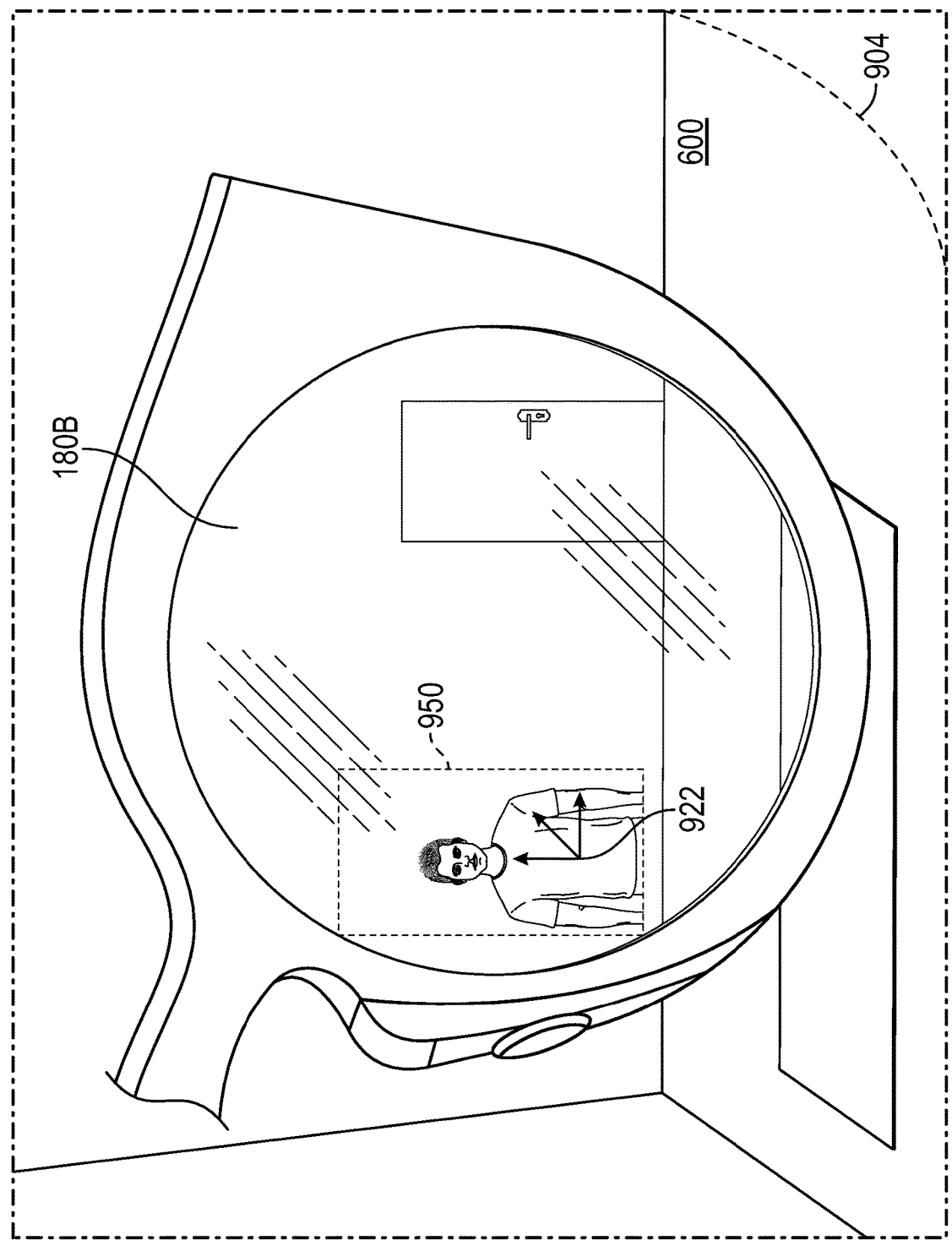

At block 814, the processor 432 presents the captured still image on the display, near the shutter gesture location 922, as an overlay relative to the physical environment. The effect, as illustrated in FIG. 9D, is similar to seeing a photographic print of the captured still image 950 placed in front of the display 180B, while the surrounding physical environment 600 remains visible through the display 180B.

The captured still image 950 is presented on the display 180B near the shutter gesture location 922, which was determined relative to the physical environment (as opposed to the display) which, in practice, means that the captured still image 950 is being located and continually updated by the SLAM algorithm. In this aspect, the captured still image 950 is treated like a virtual object in augmented reality, being displayed in the physical environment 600. The captured still image 950 when presented on the display 180B, appears to be anchored to the physical environment 600. For example, if the wearer of the eyewear device 100 is walking forward when the captured still image 950 is presented on the display, the captured still image 950 will appear to be suspended in the environment 600, in front of the wearer, until the wearer walks past the place (i.e., the shutter gesture location 922) where the captured still image 950 is anchored. As illustrated in FIG. 9C, the eyewear device 100 has moved to the right (relative to FIG. 9B); however, the captured still image 950 remains presented at (and anchored to) the shutter gesture location 922. The captured still image 950 may be viewed for a longer time by slowing or stopping, or by walking backward until the captured still image 950 is visible.

The captured still image 950 is presented on the display 180B, in one example, for a predetermined and configurable time duration, such as five seconds, before it disappears. The configurable time duration may be relatively brief (or zero), to decrease the time during which the captured still image 950 is overlaid on the physical environment 600, which may be desired, for example, when the wearer is cycling or performing a task that requires attention to the physical environment. In other situations, such as scenic or portrait photography, the configurable time duration may be relatively lengthy, to increase the time during which the captured still image 950 is viewable as an overlay relative to the physical environment 600.

In another example implementation, the captured still image 950 is persistent on the display 180B until an action is received from the wearer (e.g., a hand gesture such as a tap or a swipe, or touching a button or other input device such as a touchpad 181 on the eyewear 100). A user interface may be presented on the display 180B near the captured still image 950, allowing the wearer to select from a menu of options (e.g., save, discard, send, share, filter, crop, re-size, and the like).

In another example implementation, in addition to being presented on the display 180B, the captured still image 950 is broadcast wirelessly to nearby devices, including other eyewear devices 100 and mobile devices 401 (which, in turn, may also broadcast their captured still image to other nearby devices). In this aspect, captured still images 950 can be shared with others immediately in a group experience. Because the captured still image 950 is anchored to the physical environment 600, as described above, the captured still image 950 when shared will appear at the same location in the physical environment 600, and will be viewable from the perspective and location of each nearby device. The captured still image 950 may be broadcast or transmitted to additional or other devices, for viewing or to be stored, including servers 498 and other devices on the network 495.

Figure 8B:
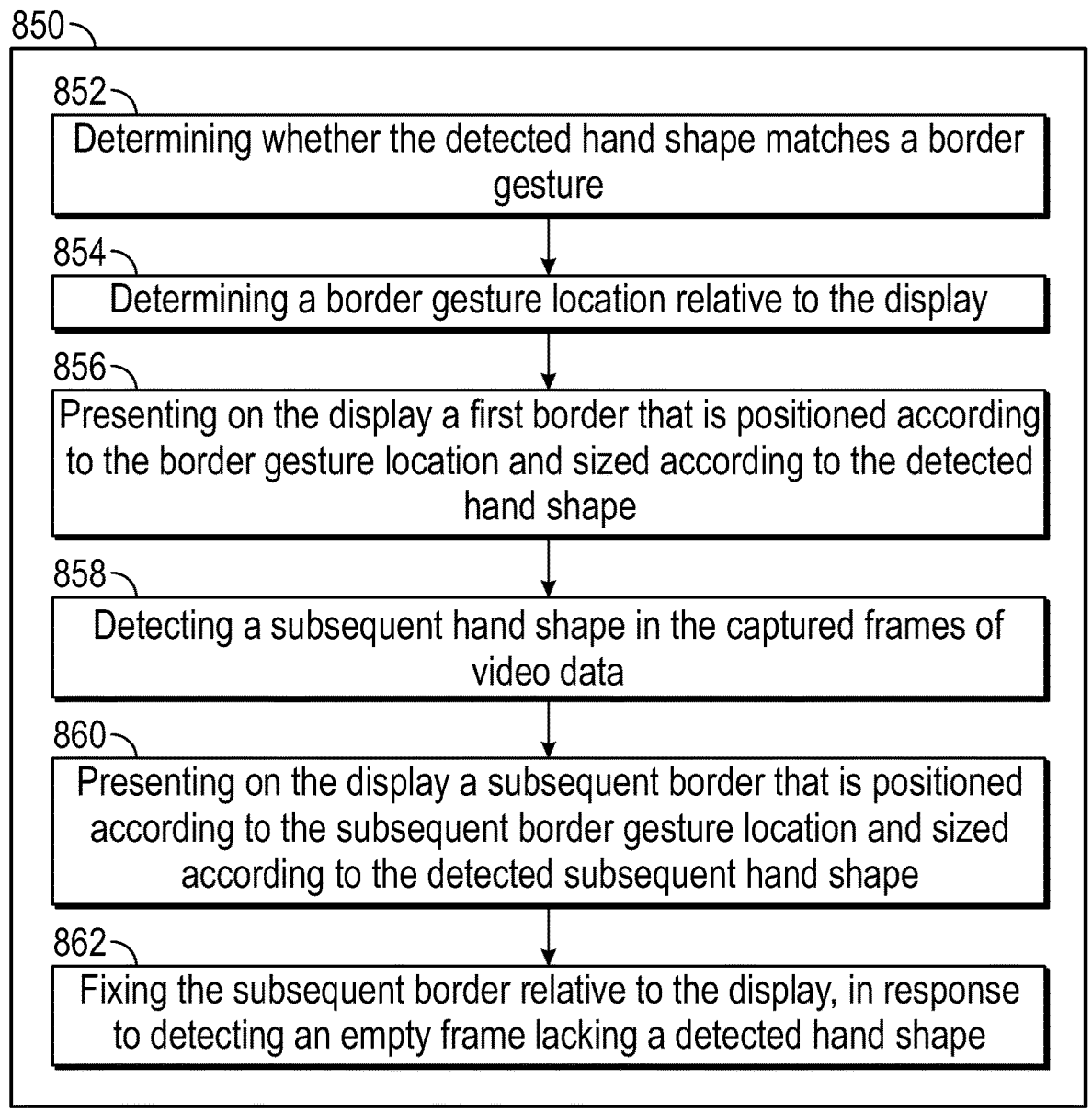
FIG. 8B is a flow chart listing the steps in an example method of establishing a border in response to hand gestures, which is useful with the capturing method of FIG. 8A.

FIG. 8B is a flow chart 850 listing the steps in an example method of establishing a border in response to hand gestures. In the example described above, the still image 950 is described with reference to a default size, shape, and orientation, and a location near the shutter gesture location 922. In the example method in FIG. 8B, and illustrated in FIG. 9B, the still image 950 is defined relative to a border 940 established in response to a border gesture 920A. The step listed in FIG. 8B, in some examples, occur after the steps described in blocks 802, 804, and 806.

At block 852, the processor 432 of an eyewear device 100 is configured to determine whether a detected hand shape substantially matches a border gesture. As used herein, a border gesture is a hand pose or gesture which, when detected, indicates that the user wishes to establish a border around a desired photographic subject in the physical environment 600. The border gesture operates like the viewfinder of a still camera, showing the approximate field of view and borders around a desired subject. The still image is captured from the video data, not by a camera taking an additional still image. The border gesture and its parameters may be stored in memory or in the hand gesture library 480. The border gesture, in one example, as shown in FIG. 9B, is a hand shape 920A in which the thumb and index finger are extended in an L shape. The border gesture, in another example, is a hand shape that includes two L-shaped hands, like a photographer or movie director framing a desired subject or shot. The border gesture, in another example, is hand shape in which the index finger is extended and appears to tap an imaginary plane, such as an imaginary pane of glass. In this example, the tap location establishes the center (or a select corner) of a border having a default size and shape. Any of a variety of hand poses or gestures may be selected as an operative border gesture and saved in memory.

At block 854, the processor 432 of an eyewear device 100 is configured to determine the border gesture location 932 relative to the display 180B, as illustrated in FIG. 9B. Unlike the shutter gesture location 922 which is determined relative to the physical environment 600, the border gesture location 932 is determined relative to the display 180B because the border gesture location 932 will be used to present a border 940 on the display 180B, at block 856.

At block 856, as illustrated in FIG. 9B, the processor 432 of an eyewear device 100 is configured to present a border 940 on the display 180B at a position associated with the determined border gesture location 932. The border 940 is sized according to the detected hand shape 920A. For example, the border 940 in FIG. 9B extends from an upper right corner (near or tangential to a surface of a fingertip of the detected hand shape 920A) to a lower border (near or tangential to a surface of the thumb of the detected hand shape 920A). The border 940 may extend beyond the aperture 175B of the display 180B, and thereby capture elements not directly visible through the display 180B. The border 940, as shown, may have a default shape, such as a rectangle having a certain aspect ratio (e.g., 6:4 or 5:3.5). The border 940 in FIG. 9B is oriented vertically according to the general orientation of the detected hand shape 920A with a vertical pointing finger. They border 940 would be oriented horizontally if the hand shape included a horizontal pointing finger. The angular orientation of the border 940 may be fixed relative to a horizontal plane of the physical environment 600, as shown in FIG. 9B. In another example, the angular orientation of the border 940 is fixed or relative to a plane defined in the display 180B. In other implementations, the angular orientation of the border 940 is unfixed and free to rotate to any position associated with the detected hand shape 920A.

The border 940 in one example is presented as a dashed line along all four sides, as shown in FIG. 9B. In other examples, the border 940 as presented includes solid or dashed lines (in one color or multiple colors, constant or flashing), angled indicia located at one or more corners, a shading, highlight, distortion, or partial masking of either the interior or exterior of the border, or any other indicia sufficient to inform the wearer about the size, shape, orientation, or angular orientation of the border 940.

In some example implementations, at block 856, the processor 432 is configured to also present on the display 180B a sight 944, such as the crosshairs illustrated in FIG. 9B. The sight 944 in one example is located near the center of the border 940, providing a guide to the wearer. For example, the wearer may wish to center the still image on a desired central feature or object. In practice, the hand shape can be moved and adjusted in size and orientation until the sight 944 appears to coincide with the central feature.

At block 858, as illustrated in FIG. 9B, the processor 432 of an eyewear device 100 is configured to detect a subsequent hand shape in the captured frames of video data. Recall that the camera may be capturing thirty frames of video data per second. As the hand shape moves and changes, the processor 432 is configured to continually detect a subsequent hand shape, determine whether it matches a border gesture (as in block 852), determine a subsequent border gesture location (similar to block 854), and then, at block 860, present on the display a subsequent border. The subsequent border is presented on the display 180B at a position associated with the determined subsequent border gesture location, and sized according to the detected subsequent hand shape, as described above in block 856.

At block 862, as illustrated in FIG. 9B, the processor 432 of an eyewear device 100 is configured to fix the size, shape, and orientation of the border 940 relative to the display 180B in response to detecting an empty frame of video data. An empty frame, as used herein, is a frame of video data in which no hand shape is detected, or the detected hand shape does not correspond to either a border gesture or a shutter gesture. In practice, an empty frame indicates that the hand has been removed from view or the hand is no longer making a hand shape that corresponds to a border gesture. In other words, the system detects that the manual task of defining a border with the hands has ended.

The final border is defined by the last frame of video data in which a border gesture was detected and may be continuously saved for later use. For example, the steps described in blocks 808 through 814 may be executed after the system has defined and saved a final border. In this example, the processor 432 first establishes a final border and then later, after a period of relative inactivity and in response to a detected shutter gesture, captures a still image according to the established final border. In this example sequence, the capture still image lies within and is defined by the established final border.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of capturing still images in response to hand gestures detected with an eyewear device, the eyewear device having a viewing area for observing a portion of a wearer field of view, a camera system having a camera field of view extending partly over the wearer field of view, an image processing system, a localization system, and a display, the method comprising:
    capturing frames of video data of a physical environment with the camera system, wherein each frame of video data comprises depth information for a plurality of pixels;
    determining an eyewear location relative to the physical environment with the localization system;
    detecting a hand shape in the captured frames of video data with the image processing system;
    determining whether the detected hand shape in a first frame matches a shutter gesture;
    selecting a subset of the captured frames of video data, the subset comprising one or more frames immediately preceding and following the first frame;
    identifying, from among the subset, one or more capture frames that do not include the detected hand shape; and
    presenting on the display a captured still image of the physical environment, wherein the captured still image is selected from one of the identified one or more capture frames.

2. The method of claim 1, further comprising:
    in response to determining that the detected hand shape matches the shutter gesture, presenting an indicator on the display;
    determining a shutter gesture location relative to the physical environment with the localization system, wherein the shutter gesture location is associated with the detected hand shape matching the shutter gesture;
    presenting the captured still image on the display near the shutter gesture location, such that the still image appears anchored relative to the physical environment.

3. The method of claim 2, further comprising:
    broadcasting the captured still image and the shutter gesture location, such that the captured still image is viewable by other devices that are capturing local frames of video data according to the method.

4. The method of claim 1, further comprising:
    determining whether the detected hand shape in a second frame matches a border gesture;
    determining a border gesture location relative to the physical environment with the localization system, wherein the border gesture location is associated with the detected hand shape matching the border gesture;
    presenting on the display a first border that is positioned according to the border gesture location and sized according to the detected hand shape,
    wherein the process of capturing a still image further comprises capturing a still image within and defined by the first border.

5. The method of claim 4, further comprising:
    detecting a subsequent hand shape in the frames of video data;
    determining whether the detected subsequent hand shape in a subsequent frame matches a border gesture;
    determining a subsequent border gesture location relative to the physical environment;
    presenting on the display a subsequent border that is positioned according to the subsequent border gesture location and sized according to the detected subsequent hand shape;
    detecting an empty frame of video data, wherein the empty frame is characterized by lack of a border gesture;
    in response to detecting the empty frame, fixing the position and size of the subsequent border relative to the display.

6. The method of claim 4, wherein the shutter gesture is a distal end of an index finger in contact with a distal end of a thumb and the border gesture is the distal end of the index finger spaced apart from the thumb.

7. The method of claim 1, wherein capturing a still image within a capture frame further comprises:
    selecting a subset of frames of video data comprising one or more frames immediately preceding and following the first frame;
    determining presence or absence of the detected hand shape in each frame of the subset of frames;
    determining which frames among the subset of frames include an image of the detected hand shape; and
    selecting the capture frame from among the subset, such that the capture frame does not include the image of the detected hand shape.

8. An image capture system, comprising:
    an eyewear device comprising a processor, a memory, an image processing system, a localization system, and a display;
    programming in the memory, wherein execution of said programming by the processor configures the eyewear device to perform functions, including functions to:
    capture frames of video data of a physical environment with a camera system, wherein each frame of video data comprises depth information for a plurality of pixels;
    determine an eyewear location relative to the physical environment with the localization system;
    detect a hand shape in the captured frames of video data with the image processing system;
    determine whether the detected hand shape in a first frame matches a shutter gesture;
    select a subset of the captured frames of video data, the subset comprising one or more frames immediately preceding and following the first frame;
    identify, from among the subset, one or more capture frames that do not include the detected hand shape; and present on the display a captured still image of the physical environment, wherein the captured still image is selected from one of the identified one or more capture frames.

9. The system of claim 8, wherein the execution of the programming further configures the eyewear device to:
in response to determining that the detected hand shape matches the shutter gesture, present an indicator on the display;
determine a shutter gesture location relative to the physical environment with the localization system, wherein the shutter gesture location is associated with the detected hand shape matching the shutter gesture;
present the captured still image on the display near the shutter gesture location, such that the still image appears anchored relative to the physical environment.

10. The system of claim 9, wherein the execution of the programming further configures the eyewear device to:
broadcast the captured still image and the shutter gesture location, such that the captured still image is viewable by other devices that are capturing local frames of video data according to the image capture system.

11. The system of claim 8, wherein the execution of the programming further configures the eyewear device to:
determine whether the detected hand shape in a second frame matches a border gesture;
determine a border gesture location relative to the physical environment with the localization system, wherein the border gesture location is associated with the detected hand shape matching the border gesture;
present on the display a first border that is positioned according to the border gesture location and sized according to the detected hand shape,
wherein the function of capturing a still image further comprises a function to capture a still image within and defined by the first border.

12. The system of claim 11, wherein the execution of the programming further configures the eyewear device to:
detect a subsequent hand shape in the frames of video data;
determine whether the detected subsequent hand shape in a subsequent frame matches a border gesture;
determine a subsequent border gesture location relative to the physical environment;
present on the display a subsequent border that is positioned according to the subsequent border gesture location and sized according to the detected subsequent hand shape;
detect an empty frame of video data, wherein the empty frame is characterized by lack of a border gesture;
in response to detecting the empty frame, fix the position and size of the subsequent border relative to the display.

13. The system of claim 11, wherein the shutter gesture is a distal end of an index finger in contact with a distal end of a thumb and the border gesture is the distal end of the index finger spaced apart from the thumb.

14. The system of claim 8, wherein the function of capturing a still image within a capture frame further comprises functions to:
select a subset of frames of video data comprising one or more frames immediately preceding and following the first frame;
determine presence or absence of the detected hand shape in each frame of the subset of frames;
determine which frames among the subset of frames include an image of the detected hand shape; and
select the capture frame from among the subset, such that the capture frame does not include the image of the detected hand shape.

15. A non-transitory computer-readable medium storing program code which, when executed, is operative to cause an electronic processor to perform the steps of:
capturing frames of video data of a physical environment with a camera system, wherein each frame of video data comprises depth information for a plurality of pixels, and wherein the camera system is coupled to an eyewear device comprising a processor, a memory, an image processing system, and a localization system;
determining an eyewear location relative to the physical environment with the localization system;
detecting a hand shape in the captured frames of video data with the image processing system;
determining whether the detected hand shape in a first frame matches a shutter gesture;
selecting a subset of the captured frames of video data, the subset comprising one or more frames immediately preceding and following the first frame;
identifying, from among the subset, one or more capture frames that do not include the detected hand shape; and
presenting on a display a captured still image of the physical environment, wherein the captured still image is selected from one of the identified one or more capture frames.

16. The non-transitory computer-readable medium storing program code of claim 15, wherein the program code, when executed, is operative to cause the electronic processor to perform the further steps of:
in response to determining that the detected hand shape matches the shutter gesture, presenting an indicator on the display;
determining a shutter gesture location relative to the physical environment with the localization system, wherein the shutter gesture location is associated with the detected hand shape matching the shutter gesture;
presenting the captured still image on the display near the shutter gesture location, such that the still image appears anchored relative to the physical environment.

17. The non-transitory computer-readable medium storing program code of claim 16, wherein the program code, when executed, is operative to cause the electronic processor to perform the further steps of:
broadcasting the captured still image and the shutter gesture location, such that the captured still image is viewable by other devices that are capturing local frames of video data according to the steps.

18. The non-transitory computer-readable medium storing program code of claim 15, wherein the program code, when executed, is operative to cause the electronic processor to perform the further steps of:
determining whether the detected hand shape in a second frame matches a border gesture;
determining a border gesture location relative to the physical environment with the localization system, wherein the border gesture location is associated with the detected hand shape matching the border gesture;
presenting on the display a first border that is positioned according to the border gesture location and sized according to the detected hand shape,
wherein the process of capturing a still image further comprises capturing a still image within and defined by the first border.

19. The non-transitory computer-readable medium storing program code of claim 18, wherein the program code, when executed, is operative to cause the electronic processor to perform the further steps of:

detecting a subsequent hand shape in the frames of video data;

determining whether the detected subsequent hand shape in a subsequent frame matches a border gesture;

determining a subsequent border gesture location relative to the physical environment;

presenting on the display a subsequent border that is positioned according to the subsequent border gesture location and sized according to the detected subsequent hand shape;

detecting an empty frame of video data, wherein the empty frame is characterized by lack of a border gesture;

in response to detecting the empty frame, fixing the position and size of the subsequent border relative to the display.

20. The non-transitory computer-readable medium storing program code of claim 15, wherein the program code, when executed, is operative to cause the electronic processor to perform the further steps of:

selecting a subset of frames of video data comprising one or more frames immediately preceding and following the first frame;

determining presence or absence of the detected hand shape in each frame of the subset of frames;

determining which frames among the subset of frames include an image of the detected hand shape; and selecting the capture frame from among the subset, such that the capture frame does not include the image of the detected hand shape.

\* \* \* \* \*